(12) United States Patent
Hwang et al.

(10) Patent No.: US 12,492,997 B2
(45) Date of Patent: Dec. 9, 2025

(54) INSPECTION APPARATUS AND METHOD

(71) Applicant: Samsung Display Co., LTD., Yongin-si (KR)

(72) Inventors: Tae-Jin Hwang, Yongin-si (KR); Se-Kwang Han, Yongin-si (KR); Jaemin Son, Yongin-si (KR); Seonghyeon Cheon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 271 days.

(21) Appl. No.: 18/367,540

(22) Filed: Sep. 13, 2023

(65) Prior Publication Data
US 2024/0192142 A1 Jun. 13, 2024

(30) Foreign Application Priority Data

Dec. 13, 2022 (KR) .................. 10-2022-0173951

(51) Int. Cl.
G01N 21/88 (2006.01)
(52) U.S. Cl.
CPC ..... G01N 21/8806 (2013.01); G01N 21/8851 (2013.01)
(58) Field of Classification Search
CPC .................. G01N 21/8806; G01N 21/8851
See application file for complete search history.

(56) References Cited

U.S. PATENT DOCUMENTS

| 7,505,155 B2 | 3/2009 | Jang et al. | |
| 2004/0151361 A1* | 8/2004 | Bedard | G01N 33/346 |
| | | | 382/141 |
| 2006/0153492 A1* | 7/2006 | Treves | G01N 21/95 |
| | | | 385/14 |

FOREIGN PATENT DOCUMENTS

| JP | 5601095 B2 | 8/2014 |
| KR | 100623250 B1 | 9/2006 |

* cited by examiner

Primary Examiner — Georgia Y Epps
Assistant Examiner — Don J Williams
(74) Attorney, Agent, or Firm — CANTOR COLBURN LLP

(57) ABSTRACT

Disclosed are inspection apparatuses and methods. The inspection apparatus includes a light source configured to irradiate a beam to an inspection object including a first part and a second part different from the first part; an inspection module spaced apart from the inspection object and onto which a beam, whose path is changed after being irradiated to the inspection object, is incident; and a separator between the inspection object and the inspection module and through which at least a portion of the beam, whose path is changed, passes. The separator includes: a frame in which an opening is defined, and a separation member in the opening and configured to change a path of a beam, which passes through the separator.

20 Claims, 16 Drawing Sheets

INSPECTION APPARATUS AND METHOD

This application claims priority to Korean Patent Application No. 10-2022-0173951 filed on Dec. 13, 2022, and all the benefits accruing therefrom under 35 U.S.C. § 119, the content of which in its entirety is herein incorporated by reference.

BACKGROUND

The present invention relates to an inspection apparatus and method, and more particularly, to an inspection apparatus and method with increased reliability in determination of failure.

Various inspection apparatuses may be used to inspect a display device. Among these inspection apparatuses, an optical inspection apparatus may use a camera to inspect the display device.

For example, the optical inspection apparatus may examine the presence of fine particles, open failure, or short defects of less than several to tens of micrometers (μm). In addition, an optical inspection apparatus may check the presence of residual layers or foreign substances of greater than several hundreds of micrometers (μm).

SUMMARY

An embodiment of the present invention provides an inspection apparatus and method capable of effectively detecting foreign substances or defects on an inspection object.

An embodiment of the present invention provides an inspection apparatus and method capable of efficiently eliminating noise other than extraneous matters by using a separator to effectively detect foreign substances or defects on an inspection object.

An embodiment of the present invention provides an inspection apparatus and method capable of obtaining inspection conditions by which noise is efficiently eliminated in detecting foreign substances or defects according to the position where a separator is used to irradiate a beam to an inspection object.

An embodiment of the present invention provides an inspection apparatus and method capable of increasing inspection efficiency and reducing inspection costs by inspecting an inspection object under an inspection condition by which noise is effectively eliminated.

An embodiment of the present invention provides an inspection apparatus and method capable of avoiding time and cost problems due to re-operation of an inspection apparatus or re-execution of an inspection method by inspecting an inspection object under an inspection condition by which noise is effectively eliminated.

According to an embodiment of the present invention, an inspection apparatus includes: a light source configured to irradiate a beam to an inspection object including a first part and a second part different from the first part; an inspection module spaced apart from the inspection object and onto which a beam, whose path is changed after being irradiated to the inspection object, is incident; and a separator between the inspection object and the inspection module and through which at least a portion of the beam, whose path is changed, passes. The separator includes: a frame in which an opening is defined; and a separation member in the opening and configured to change a path of a beam, which passes through the separator.

In an embodiment, the separation member may be provided in plural and the plurality of separation members may be spaced apart from each other. The separation members may include: at least one first separation member configured to convert a beam, which passes therethrough, a first beam; and at least one second separation member configured to convert a beam, which passes therethrough, into a second beam. The first beam may have a second data corresponding to a beam, which is reflected from the second part and passes through the opening. The second beam may have a first data corresponding to a beam, which is reflected from the first part and passes through the opening.

In an embodiment, the inspection module may include: an imaging part, onto which the beam passing through the separator is incident, and configured to convert the incident beam into the first data and the second data; a data processing part configured to establish a first critical value based on a first grayscale level of a first comparative data which is to be compared with the first data, establish a second critical value based on a second grayscale level of a second comparative data which is to be compared with the second data, and derives a separation critical value from the first critical value and the second critical value; and a controlling part configured to adjust a state of the beam irradiated from the light source to the inspection object in accordance with the separation critical value.

In an embodiment, in accordance with the separation critical value, the controlling part may adjust at least one of a wavelength of the beam irradiated to the inspection object and an angle at which the beam is irradiated to the inspection object with respect to a normal direction of the inspection object.

In an embodiment, the inspection apparatus may further include a moving module configured to change positions of the separator and the imaging part. The moving module may drive the separator to rotate or drive the separator and the imaging part to move on the inspection object.

In an embodiment, the first part and the second part may include different materials from each other.

In an embodiment, the first part may include a plurality of first protrusions each of which extends along one direction and which are arranged along a direction that intersects the one direction. The second part may include at least one second protrusion between adjacent first protrusions of the plurality of first protrusions.

According to an embodiment of the present invention, an inspection method includes: preparing a light source, an inspection object that includes a first part and a second part different from the first part, a separator that includes a frame in which an opening is defined and a separation member in the opening, and an inspection module; placing the separator on the inspection object, placing the inspection module spaced apart from the inspection object across the separator, and irradiating, by the light source, a beam to the inspection object; obtaining data converted from a beam incident from the inspection object through the separator onto the inspection module; and based on a grayscale level of a comparative data, deriving a separation critical value from data about a first beam and data about a second beam in the beam incident onto the inspection module, where the first beam and the second beam have different critical values from each other.

In an embodiment, the separation member may be provided in plural spaced and the plurality of separation members may be apart from each other. The separation members may include: at least one first separation member configured to convert a beam, which passes therethrough, into the first beam; and at least one second separation member configured to convert a beam, which passes therethrough, into the second beam. The first beam may have a second data corresponding to a beam, which is reflected from the second part and passes through the opening. The second beam may have a first data corresponding to a beam, which is reflected from the first part and passes through the opening.

In an embodiment, the step of deriving the separation critical value may include: establishing a first critical value based on a grayscale level of a first comparative data which is to be compared with the first data; establishing a second critical value based on a grayscale level of a second comparative data which is to be compared with the second data; and deriving the separation critical value from the first critical value and the second critical value.

In an embodiment, the inspection method may further include, in accordance with the separation critical value, adjusting at least one of a wavelength of the beam irradiated to the inspection object and an angle at which the beam is irradiated to the inspection object with respect to a normal direction of the inspection object.

In an embodiment, the inspection method may further include: changing positions of the separator and the inspection module, and thereafter irradiating the inspection object with the beam to derive the separation critical value, irradiating the beam being performed repeatedly several times; and obtaining an inspection condition as a set of separation critical values for the position of the inspection module.

In an embodiment, the inspection method may further include: moving the inspection module to a first position; and based on the inspection condition, calculating a separation critical value with respect to the first position; and based on the calculated separation critical value, adjusting at least one of a wavelength of the beam irradiated to the inspection object and an angle at which the beam is irradiated to the inspection object with respect to a normal direction of the inspection object.

In an embodiment, the inspection object may include a first region and a second region adjacent to the first region.

In changing the positions of the separator and the inspection module, on the first region, the separator may be spaced apart from the inspection object. In changing the positions of the separator and the inspection module, on the second region, the separator may be close to or spaced apart from the inspection object.

In an embodiment, the first part and the second part may include different materials from each other.

In an embodiment, the first part may include a plurality of first protrusions each of which extends along one direction and which are arranged along a direction that intersects the one direction. The second part may include at least one second protrusion between adjacent first protrusions of the plurality of first protrusions.

In an embodiment, the inspection module may use a bright field or a dark field.

According to an embodiment of the present invention, an inspection apparatus includes: a light source configured to irradiate a beam to an inspection object including a first part and a second part different from the first part; an inspection module spaced apart from the inspection object and onto which a beam, whose path is changed after being irradiated to the inspection object, is incident; and a separator between the inspection object and the inspection module and through which at least a portion of the beam, whose path is changed, passes. The separator may include: at least one first separation member configured to convert a beam, which passes therethrough, into a first beam; at least one second separation member configured to convert a beam, which passes therethrough, into a second beam; and a frame, which supports the first separation member and the second separation member.

In an embodiment, the first beam may have a second data corresponding to a beam, which is reflected from the second part and passes through the separator. The second beam may have a first data corresponding to a beam, which is reflected from the first part and passes through the separator.

In an embodiment, the inspection module may include: an imaging part, onto which the beam passing through the separator is incident, and configured to convert the incident beam into the first data and the second data; a data processing part configured to establish a first critical value based on a first grayscale level of a first comparative data which is to be compared with the first data, establish a second critical value based on a second grayscale level of a second comparative data which is to be compared with the second data, and derive a separation critical value from the first critical value and the second critical value; and a controlling part configured to adjust a state of the beam irradiated from the light source to the inspection object in accordance with the separation critical value.

DETAILED DESCRIPTION

Figure 1:
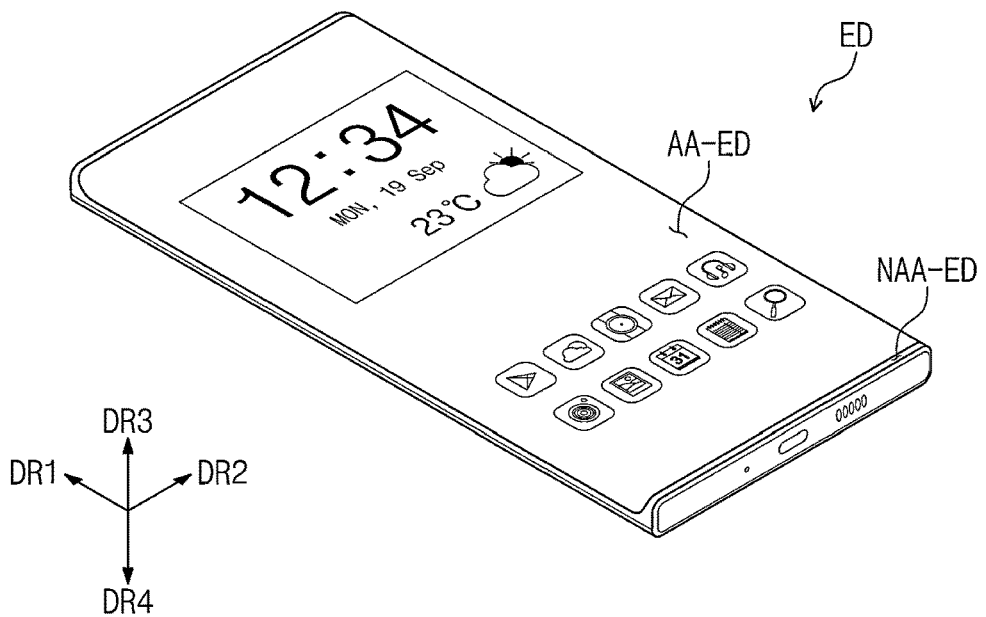
FIG. 1 illustrates an assembled perspective view showing an electronic device according to an embodiment of the present invention.

In this description, when a certain component (or region, layer, portion, etc.) is referred to as being "on", "connected to", or "coupled to" other component(s), the certain component may be directly on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations defined by associated components.

It will be understood that, although the terms "first", "second", etc. may be used herein to describe various components, these components should not be limited by these terms. These terms are only used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

The following will now describe some embodiments of the present invention in conjunction with the accompanying drawings.

Figure 2:
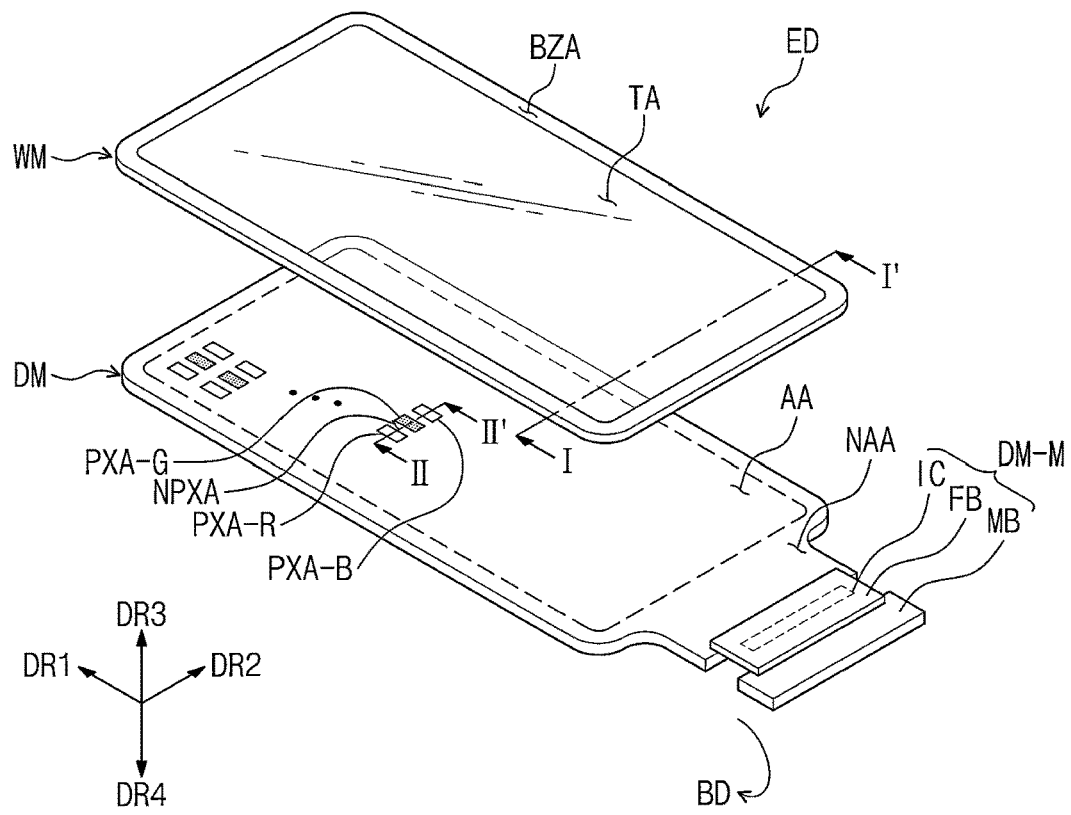
FIG. 2 illustrates an exploded perspective view showing an electronic device according to an embodiment of the present invention.
Figure 3:
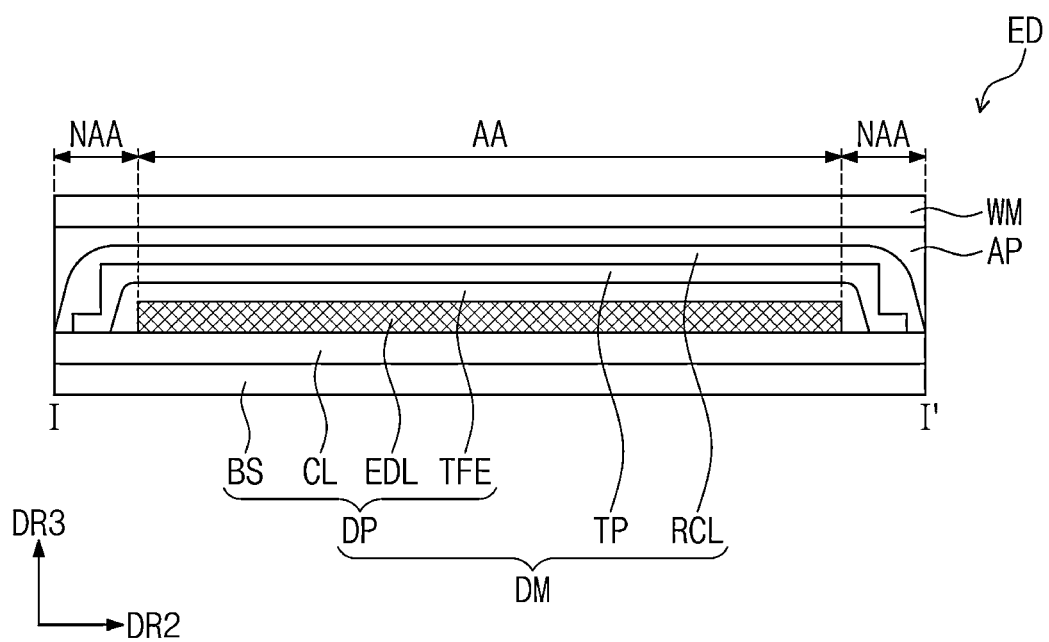
FIG. 3 illustrates a cross-sectional view showing an electronic device according to an embodiment of the present invention.

FIG. 1 illustrates an assembled perspective view showing an electronic device ED according to an embodiment of the present invention. FIG. 2 illustrates an exploded perspective view showing the electronic device ED according to an embodiment of the present invention. FIG. 3 illustrates a cross-sectional view showing the electronic device ED according to an embodiment of the present invention.

The electronic device ED according to an embodiment of the present invention depicted in FIGS. 1 to 3 may be an apparatus activated with an electronic signal. In an embodiment, for example, the electronic device ED may be a mobile phone, a tablet computer, an automotive navigation system, a game console, or a wearable apparatus, but the present invention is not limited thereto. FIG. 1 depicts by way of example a mobile phone as the electronic device ED.

The electronic device ED according to an embodiment may display an image through an active region AA-ED. The active region AA-ED may include a plane defined by a first direction DR1 and a second direction DR2. The active region AA-ED may further include a curved surface bent from at least one side of the plane defined by the first direction DR1 and the second direction DR2.

A peripheral region NAA-ED may be adjacent to the active region AA-ED. The peripheral region NAA-ED may surround the active region AA-ED. Therefore, a shape of the active region AA-ED may be substantially defined by the peripheral region NAA-ED. This, however, is illustrated by way of example, and the peripheral region NAA-ED may be disposed adjacent to only one side of the active region AA-ED or may be omitted. The electronic device ED according to an embodiment of the present invention may include variously shaped active regions AA-ED, and the present invention is not limited to a certain embodiment.

The electronic device ED according to an embodiment of FIG. 1 is illustrated to include two curved surfaces bent from opposite sides of the plane defined by the first direction DR1 and the second direction DR2. The shape of the active region AA-ED, however, is not limited thereto. In an embodiment, for example, the active region AA-ED may include only the plane, or may further include a plurality of curved surfaces bent from at least two sides of the plane, for example, four curved surfaces bent from four sides of the plane.

The following figures including FIG. 1 show first to fourth directions DR1 to DR4, and in this description, directions indicated by the first to fourth directions DR1 to DR4 are relative concepts and may thus be changed to other directions.

In this description, the first direction DR1 and the second direction DR2 may intersect each other, and the third direction DR3 may be a direction normal to the plane defined by the first direction DR1 and the second direction DR2. The fourth direction DR4 may be a direction that is normal to the plane defined by the first direction DR1 and the second direction DR2 while being oppositely directed to the third direction DR3.

A thickness direction of the electronic device ED may be parallel to the third direction DR3 that is a normal direction to the plane defined by the first direction DR1 and the second direction DR2. In this description, front and rear surfaces (or top and bottom surfaces) of components included in the electronic device ED may be defined based on the third direction DR3.

In this description, the expression "when viewed in plan" may include the meaning of "when viewed in a normal direction of the plane defined by the first direction DR1 and the second direction DR2." In this description, unless otherwise specifically defined, the language "overlap" may mean "overlap when viewed in plan."

The electronic device ED according to an embodiment may include a display module DM. The display module DM may be a component that produces an image and detects an externally applied pressure. The display module DM according to an embodiment may include a display panel DP. The display module DM according to an embodiment may further include a sensor layer TP disposed on the display panel DP and an optical layer RCL disposed on the sensor layer TP. The present invention, however, is not limited thereto, and in an embodiment, the sensor layer TP or the optical layer RCL may be omitted.

The display module DM may include an active region AA and a peripheral region NAA. The active region AA may be a zone activated with an electric signal. The peripheral region NAA may be a zone positioned adjacent to at least one side of the active region AA.

The active region AA may correspond to the active region AA-ED of the electronic device ED depicted in FIG. 1. The peripheral region NAA may correspond to the peripheral region NAA-ED of the electronic device ED depicted in FIG. 1.

Referring to FIG. 2, the active region AA may include a plurality of emission regions PXA-R, PXA-G, and PXA-B. In an embodiment, for example, the electronic device ED according to an embodiment may include a first emission region PXA-R, a second emission region PXA-G, and a third emission region PXA-B. In an embodiment, the first emission region PXA-R may be a red emission region that emits red light, the second emission region PXA-G may be a green emission region that emits green light, and the third emission region PXA-B may be a blue emission region that emits blue light.

When viewed in plan, the first, second, and third emission regions PXA-R, PXA-G, and PXA-B may be distinguished from each other without overlapping each other. In an embodiment, for example, one or more non-emission regions NPXA may be disposed between neighboring emission regions PXA-R, PXA-G, and PXA-B.

FIG. 2 depicts by way of example that the emission regions PXA-R, PXA-G, and PXA-B are arranged in a stripe shape. In an embodiment, for example, in the electronic device ED according to an embodiment depicted in FIG. 2, the first emission region PXA-R, the second emission region PXA-G, and the third emission region PXA-B may be sequentially arranged along the second direction DR2.

The arrangement of the emission regions PXA-R, PXA-G, and PXA-B is not limited to that shown in FIG. 2, and the arrangement sequence of the first, second, and third emission regions PXA-R, PXA-G, and PXA-B may be variously combined in accordance with characteristics of display quality required for the electronic device ED. In an embodiment, for example, the arrangement of the emission regions PXA-R, PXA-G, and PXA-B may be an arrangement of PENTILE™ or Diamond Pixel™.

In an embodiment, among the plurality of emission regions PXA-R, PXA-G, and PXA-B, ones that emit light beams having different wavelength ranges may have their areas different from each other. In this case, the term "area" may indicate an area when viewed in the plane defined by the first direction DR1 and the second direction DR2. The present invention, however, is not limited thereto, and the emission regions PXA-R, PXA-G, and PXA-B may have the same area. In accordance with characteristics of display quality required for the electronic device ED, an area ratio between the emission regions PXA-R, PXA-G, and PXA-B may be variously adjusted, and the emission regions PXA-R, PXA-G, and PXA-B may have their planar shapes that are variously changed.

Although FIG. 2 depicts that each of the emission regions PXA-R, PXA-G, and PXA-B has a tetragonal shape when viewed in plan, the present invention is not limited thereto and each of the emission regions PXA-R, PXA-G, and PXA-B may have a polygonal shape, a circular shape, or any other suitable shape when viewed in plan.

The peripheral region NAA may surround the active region AA. The present invention, however, is not limited thereto, and unlike that shown in FIG. 2, a portion of the peripheral region NAA may be omitted. The peripheral region NAA may include a drive line or a drive circuit for driving the active region AA.

In an embodiment, the display panel DP may be a component that substantially generates an image. The display panel DP may be an emissive display panel, for example, an organic light-emitting display panel, an inorganic light-emitting display panel, a quantum-dot display panel, a micro-LED display panel, or a nano-LED display panel. In the following description, an organic light-emitting display panel is adopted as the display panel DP according to an embodiment.

FIG. 3 illustrates a cross-sectional view taken along line I-I' of FIG. 2 according to the present invention. Referring to FIG. 3, the display panel DP may include a base layer BS, a circuit layer CL, a light-emitting element layer EDL, and an encapsulation layer TFE.

The base layer BS may be a member that provides a base surface on which the circuit layer CL is disposed. The base layer BS may be a rigid substrate or a flexible substrate that can be bendable, foldable, or rollable. The base layer BS may be a glass substrate, a metal substrate, or a polymer substrate. The present invention, however, is not limited thereto, and the base layer BS may be an inorganic layer, an organic layer, or a composite material layer.

The circuit layer CL may be disposed on the base layer BS. The circuit layer CL may include a dielectric layer, a semiconductor pattern, a conductive pattern, and a signal line. A coating or deposition process may be employed such that a dielectric layer, a semiconductor layer, and a conductive layer are disposed on the base layer BS, and then a photolithography process may be performed several times to selectively pattern the dielectric layer, the semiconductor layer, and the conductive layer. Afterwards, the semiconductor pattern, the conductive pattern, and the signal line may be formed which are included in the circuit layer CL.

The light-emitting element layer EDL may be disposed on the circuit layer CL. The light-emitting element layer EDL may include a light-emitting element. In an embodiment, for example, the light-emitting element may include an organic light-emitting material, an inorganic light-emitting material, an organic-inorganic light-emitting material, a quantum dot, a quantum rod, a micro-LED, or a nano-LED.

The encapsulation layer TFE may be disposed on the light-emitting element layer EDL. The encapsulation layer TFE may cover the light-emitting element layer EDL. The encapsulation layer TFE may be disposed on the active region AA on which the light-emitting element layer EDL is disposed, and may extend onto the peripheral region NAA on which the light-emitting element layer EDL is not disposed.

The encapsulation layer TFE may protect the light-emitting element layer EDL against moisture, oxygen, and foreign substances such as dust particles. The following will further discuss in detail the encapsulation layer TFE according to an embodiment of the present invention.

The sensor layer TP may be disposed on the display panel DP. The sensor layer TP may detect an external input applied from the outside. The external input may be a user's input. The user's input may include various types of external input such as a part of user's body, light, heat, pen, and pressure.

A series of processes may be performed to form the sensor layer TP on the display panel DP. In this case, the sensor layer TP may be directly disposed on the display panel DP. In this description, the phrase "directly disposed" may mean that no third component is disposed between the sensor layer TP and the display panel DP. In this case, no adhesive member may be separately disposed between the sensor layer TP and the display panel DP. In an embodiment, for example, the sensor layer TP may be directly disposed on the encapsulation layer TFE of the display panel DP. The sensor layer TP may be coupled through an adhesive member to the display panel DP. The adhesive member may include an ordinary adhesive or glue.

The optical layer RCL may be disposed on the sensor layer TP. The optical layer RCL may be directly located on the sensor layer TP. A series of processes may form the optical layer RCL on the sensor layer TP. The optical layer RCL may reduce a reflectance of external light that is incident from outside the display module DM. The optical layer RCL may include a polarization layer or a color filter layer. In an embodiment, the optical layer RCL may be omitted.

In an embodiment of the present invention, the sensor layer TP may be omitted. In this case, the optical layer RCL may be directly disposed on the display panel DP. In an embodiment, the sensor layer TP and the optical layer RCL may be interchangeably positioned.

The electronic device ED may further include a driving part DM-M electrically connected to the display module DM. The driving part DM-M may be electrically connected to the display panel DP and the sensor layer TP. The driving part DM-M may include a driver chip IC. The driver chip IC may produce or process various kinds of electrical signal, and may be electrically connected to and control the display panel DP and the sensor layer TP.

The driving part DM-M may include a flexible circuit board FB and a driver circuit board MB. The display panel DP and the sensor layer TP may be electrically connected to one side of the flexible circuit board FB, and the driver circuit board MB may be electrically connected to another side of the flexible circuit board FB. The driver chip IC may be disposed on the flexible circuit board FB. In this case, the flexible circuit board FB may be called a chip-on-film ("CoF"). In addition, unlike that shown, the driver chip IC may be disposed on the base layer BS of the display module DM.

FIG. 2 depicts that the driving part DM-M is connected to and unfolded on one side of the display module DM, but in the electronic device ED according to an embodiment, the driving part DM-M may be disposed bent (as indicated by BD of FIG. 2) in the fourth direction DR4. In an embodiment, for example, the driving part DM-M may be bent to overlap the display panel DP when viewed in plan.

The electronic device ED according to an embodiment may further include a window WM disposed on the display module DM. The window WM may entirely cover the display module DM. The window WM may be coupled through an adhesion layer AP to the display module DM.

The window WM may have a shape that corresponds to a shape of the display module DM. In the electronic device ED according to an embodiment, the window WM may include an optically transparent dielectric material. The window WM may be a glass substrate or a polymer substrate. In an embodiment, for example, the window WM may be a chemically tempered glass substrate.

The window WM may include a transmission part TA and a bezel part BZA. The transmission part TA may be a section that corresponds to the active region AA of the display module DM, and the bezel part BZA may be a section that corresponds to the peripheral region NAA of the display module DM. The bezel part BZA may define a shape of the transmission part TA. The bezel part BZA may be adjacent to and surround the transmission part TA. The present invention, however, is not limited thereto, and the bezel part BZA may be disposed adjacent to only one side of the transmission part TA or a portion of the bezel part BZA may be omitted.

Figure 4A:
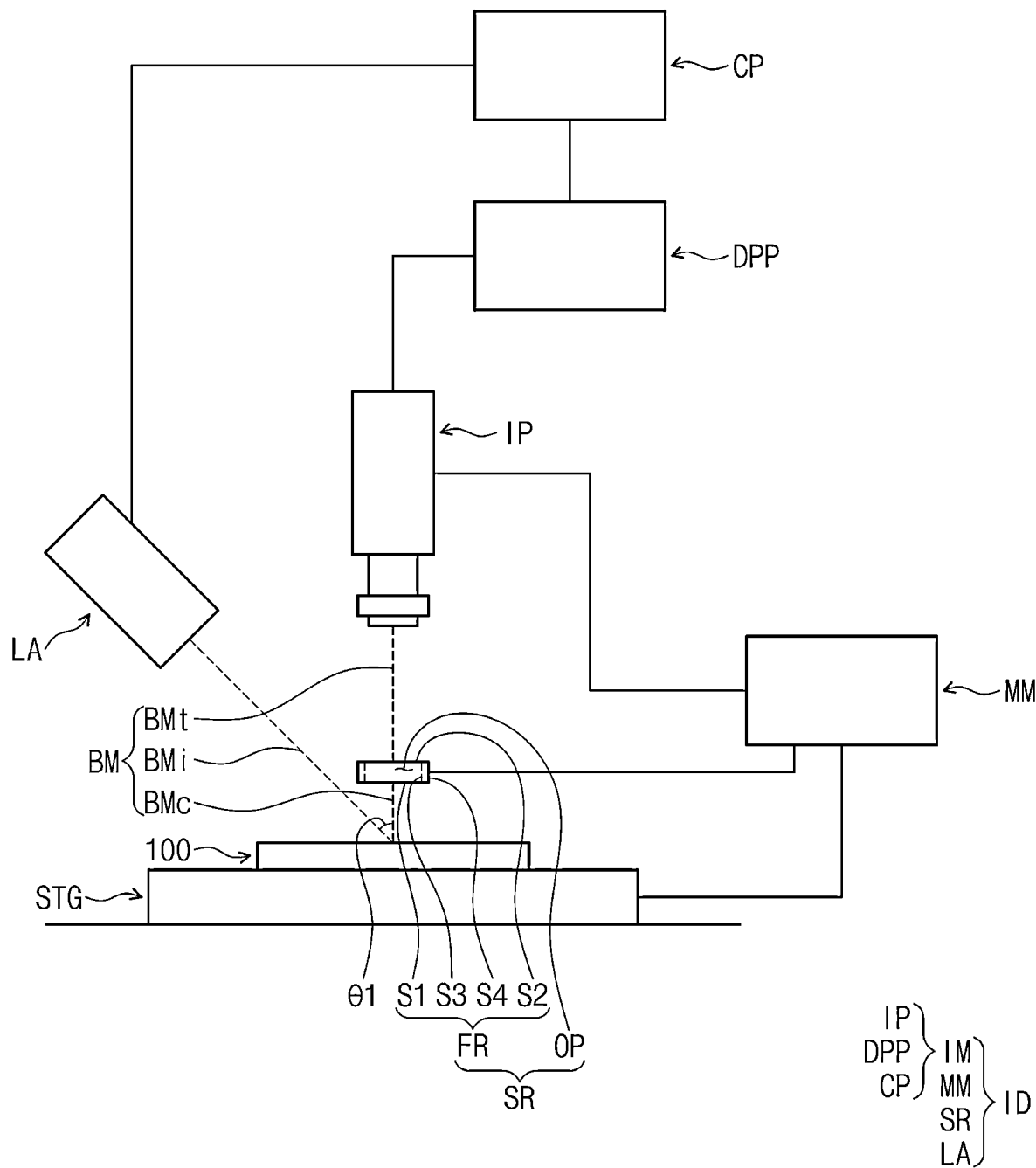
FIGS. 4A to 4C illustrate simplified schematic diagrams showing an inspection apparatus according to an embodiment of the present invention.
Figure 4B:
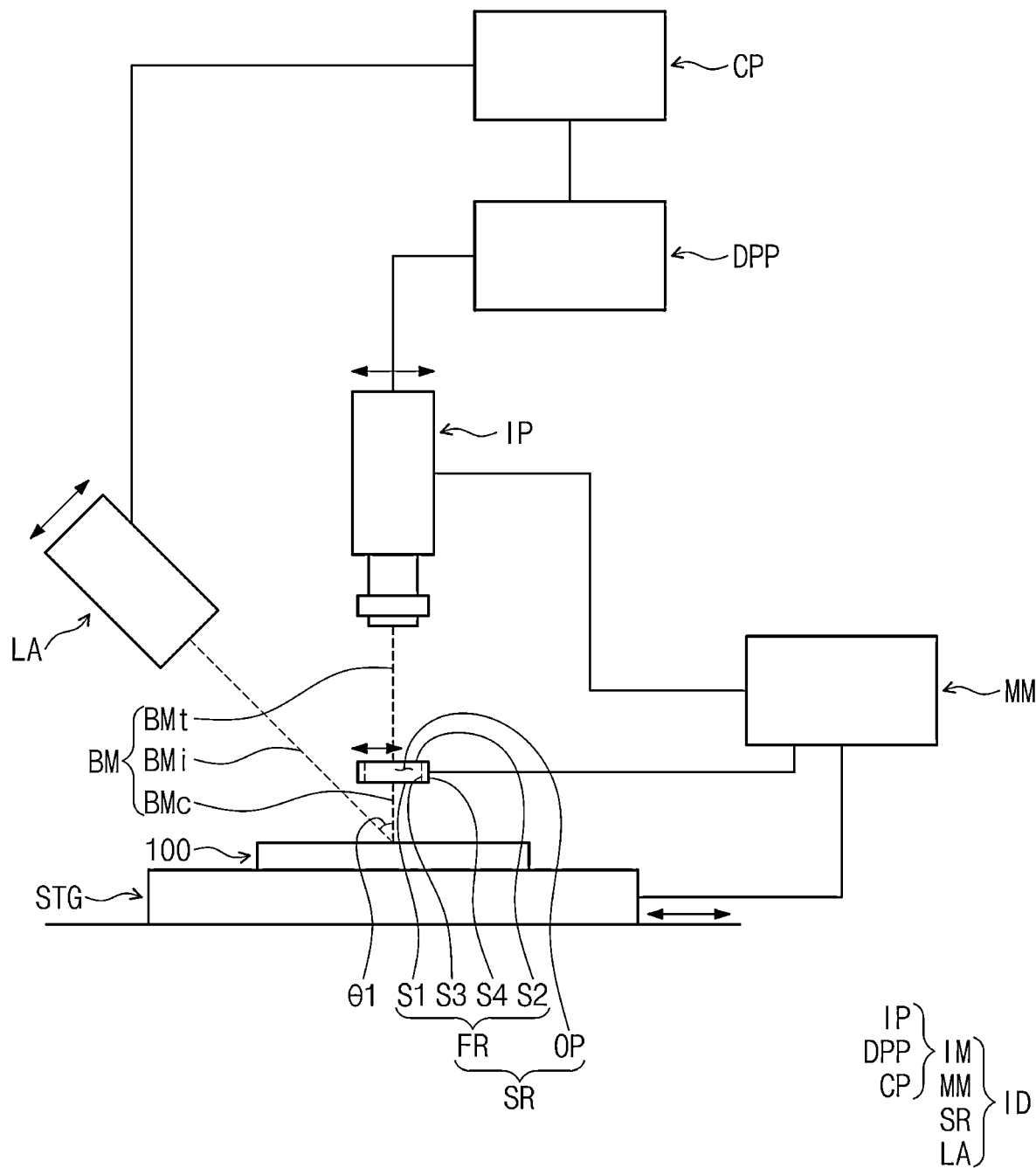
Figure 4C:
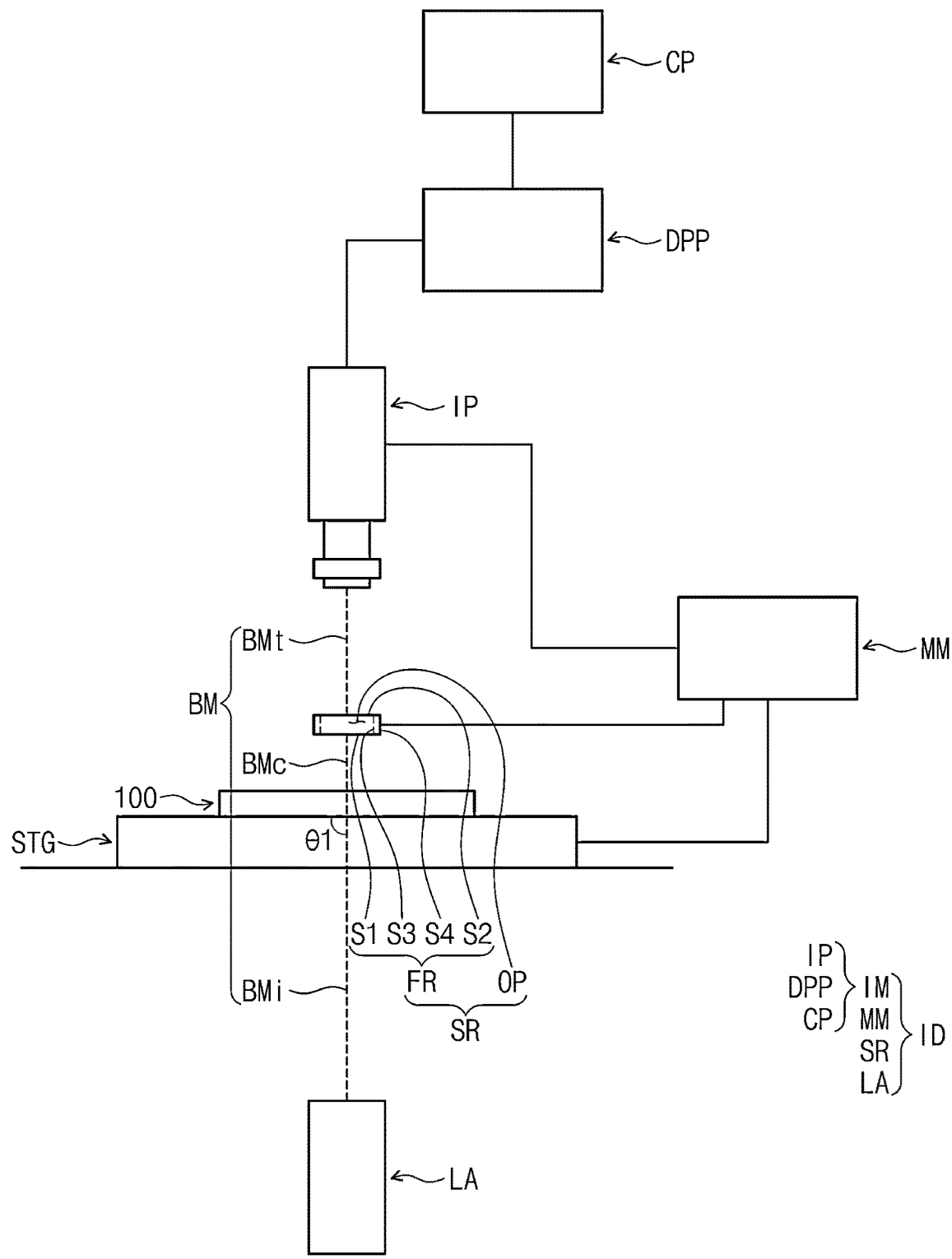

FIGS. 4A to 4C illustrate simplified schematic diagrams showing an inspection apparatus according to an embodiment of the present invention.

Referring to FIGS. 4A to 4C, an inspection apparatus ID according to an embodiment of the present invention may include a light source LA, an inspection module IM, a separator SR, and a moving module MM.

The light source LA may irradiate a beam BM to an inspection object 100. The beam BM irradiated from the light source LA to the inspection object 100 may have a wavelength that is not limited to a certain range. No limitation may be imposed on an angle θ1 made between a normal direction of the inspection object 100 and the beam BM irradiated to the inspection object 100. The angle θ1 made between a normal direction of the inspection object 100 and the beam BM irradiated to the inspection object 100 may be changed in accordance with a separation critical value or an inspection condition which will be discussed below.

The beam BM emitted from the light source LA may be irradiated to the inspection object 100 and then may be changed in irradiation path. In an embodiment, for example, the beam BM directed to the inspection object 100 may have a path different from a path of the beam BM reflected from the inspection object 100.

In an embodiment, the beam BM irradiated from the light source LA to the inspection object 100 may reflect from the inspection object 100, or in another embodiment, the beam BM irradiated from the light source LA to the inspection object 100 may pass by or through the inspection object 100. In both embodiments, the path of the beam BM may be changed between before and after the irradiation to the inspection object 100.

Referring to FIGS. 4A and 4B, the beam BM emitted from the light source LA may be irradiated to the inspection object 100, and may be classified into an incident beam BMi before being reflected from the inspection object 100, a beam BMc after being reflected from the inspection object 100, and a beam BMt after passing through the separator SR which will be discussed below.

Referring to FIG. 4C, the beam BM emitted from the light source LA may be irradiated to the inspection object 100, and may be classified into an incident beam BMi before passing through the inspection object 100, a beam BMc after passing through the inspection object 100, and a beam BMt after passing through the separator SR which will be discussed below.

The inspection object 100 may be supported on a stage STG. The inspection object 100 may be a substance where a path of the beam BMi emitted from the light source LA is changed. In an embodiment, for example, the inspection object 100 may be a substance from which the beam BMi reflects, or may be a substance by or through which the beam BMi passes. The beam BMi irradiated to the inspection object 100 may be converted into the beam BMt whose path is changed, and the beam BMt may be incident onto the inspection module IM.

The inspection object 100 may move along with the movement of the stage STG. The stage STG may be configured to allow the beam BM to pass therethrough, and thus the beam BM may travel through the stage STG to reach the inspection object 100. The present invention, however, is not limited thereto, and the stage STG may be omitted.

The inspection object 100 and the light source LA may be provided with an optical member therebetween to adjust the path of the beam BM emitted from the light source LA. The optical member may include a mirror or a lens, but the present invention is not limited thereto.

An entirety or portion of the inspection object 100 may be the display module DM discussed above. The present invention, however, is not limited thereto, and the entirety or portion of the inspection object 100 may be a component of the display module DM or may be the display panel DP in another embodiment.

The inspection module IM may receive either the beam BMt that is irradiated to the inspection object 100 and changed in path or the beam BMt that passes through the separator SR. The inspection module IM may be disposed spaced apart from the inspection object 100. The inspection module IM may be disposed spaced apart from the inspection object 100 across the separator SR which will be discussed below.

The inspection module IM may include an imaging part IP, a data processing part DPP, and a controlling part CP. The inspection module IM may use a bright field or a dark field.

When the inspection module IM uses the bright field, the inspection module IM may convert the beam BM, reflected from the inspection object 100 and incident onto the inspection module IM, into data to obtain information about the inspection object 100. When the inspection module IM uses the dark field, the inspection module IM may convert a first partial beam BM, reflected from the inspection object 100 and incident onto the inspection module IM, and a second partial beam BM, reflected from the inspection object 100 and not incident onto the inspection module IM, into data and then compare the converted data of the first partial beam BM and the converted data of the second partial beam BM to obtain information about the inspection object 100.

The imaging part IP may use the beam BMt incident thereon to capture an image of a surface of the inspection object 100. In an embodiment, the imaging part IP may receive the beam BMt that passes through the separator SR and convert the received beam BMt into data.

The data processing part DPP may establish a first critical value based on a first grayscale level of a first comparative data which is to be compared with a first data, may establish a second critical value based on a second grayscale level of a second comparative data which is to be compared with a second data, and may derive a separation critical value from the first critical value and the second critical value.

In accordance with the separation critical value, the controlling part CP may adjust a state of the beam BMi irradiated from the light source LA to the inspection object 100. The imaging part IP, the data processing part DPP, and the controlling part CP will be further discussed in detail below.

The separator SR may be disposed between the inspection object 100 and the inspection module IM. The separator SR may allow passage of at least a portion of the beam BMc whose path is changed from the inspection object 100. The beam BMc whose path is changed from the inspection object 100 may have a path different from a path of the beam BMt after passing through the separator SR.

The separator SR may have a first surface S1, a second surface S2, a third surface S3, and a fourth surface S4. The first surface S1 may be directed toward the inspection object 100, the second surface S2 may be opposite to the first surface S1, the third surface S3 may have an opening OP while connecting the first surface S1 and the second surface S2, and the fourth surface S4 may be opposite to the third surface S3 while connecting the first surface S1 and the second surface S2. In this case, the first surface S1 may be defined as a bottom surface, the second surface S2 may be defined as a top surface, the third surface S3 may be defined as an inner surface, and the fourth surface S4 may be defined as an outer surface.

A separation member (see SRP of FIG. 6), which will be discussed below, may be positioned in the opening OP and supported by the third surface S3. The separation member (see SRP of FIG. 6) may change a path of the beam BM that passes through the separator SR. The separation member (see SRP of FIG. 6) may not always change the path of the beam BM that passes through the separator SR, and sometimes the beam BM may maintain its path even when passing through the separator SR if the beam BM passes the opening OP except for the separation member.

The moving module MM may move the stage STG, the separator SR, or the inspection module IM. In an embodiment, for example, the moving module MM may move a frame FR of the separator SR and the imaging part IP of the inspection module IM.

The light source LA may irradiate the beam BMi to an entirety of the inspection object 100. In this case, the moving module MM may move the separator SR and the inspection module IM to variously change their positions on the inspection object 100. In an embodiment, the beam BM reflected from various positions of the inspection object 100 may be incident through the separator SR onto the inspection module IM. Therefore, it may be possible to obtain all information about the beam BM reflected from the entirety of the inspection object 100.

The present invention, however, is not limited thereto, and the light source LA may irradiate the beam BMi to a portion of the inspection object 100 in another embodiment. In this case, the moving module MM may move the stage STG to cause the beam BMi to have various irradiation positions on the inspection object 100 disposed on the stage STG. Therefore, it may be possible to obtain all information about the beam BMc whose path is changed on the entirety of the inspection object 100. In an embodiment, it may be possible to obtain all information about the beam BMc reflected from the entirety of the inspection object 100.

The inspection apparatus ID according to an embodiment of the present invention may include a support structure. The support structure may support at least one of the inspection module IM, the separator SR, and the light source LA.

Figure 5A:
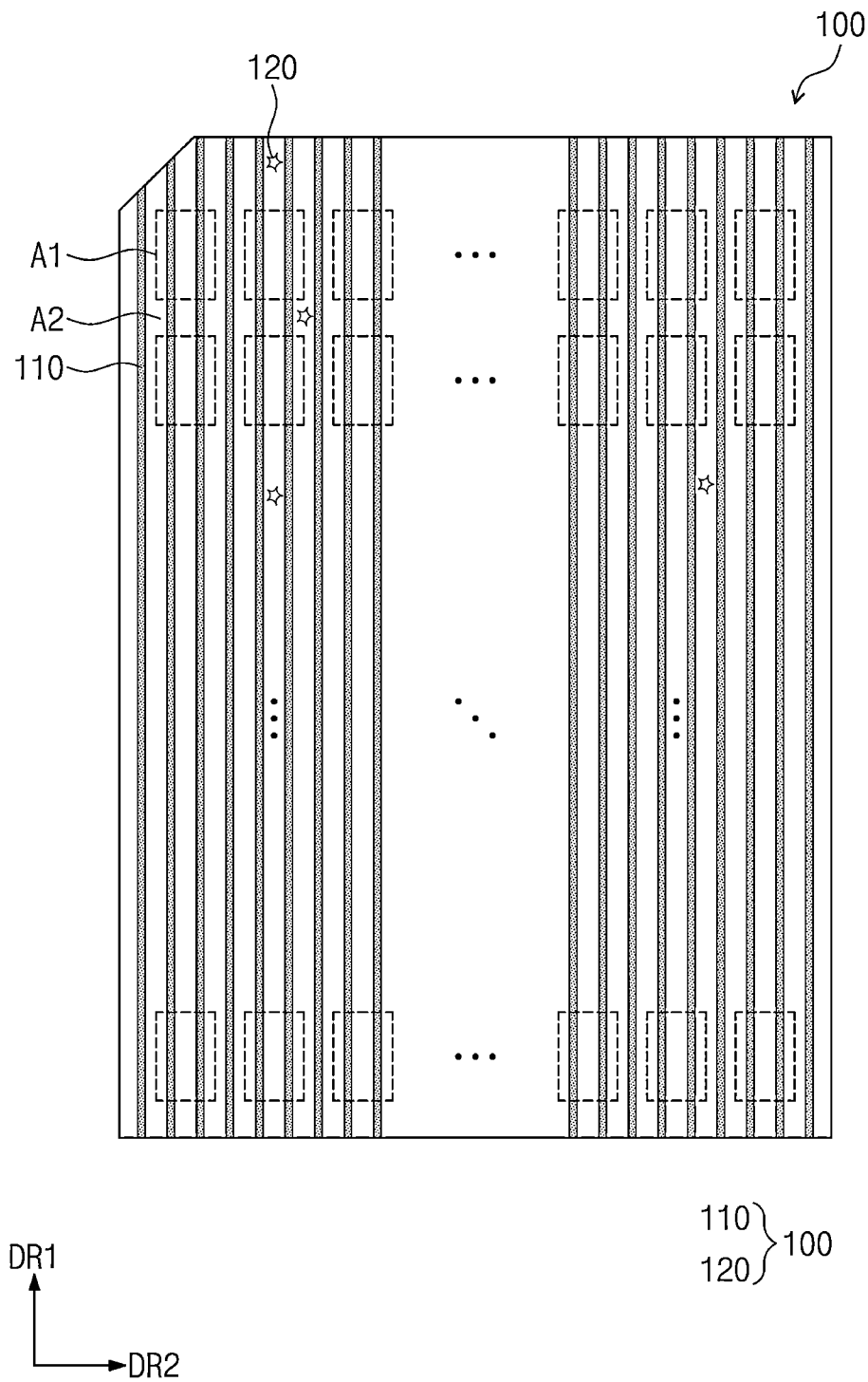
FIGS. 5A to 5D illustrate plan views showing an inspection object according to an embodiment of the present invention.
Figure 5B:
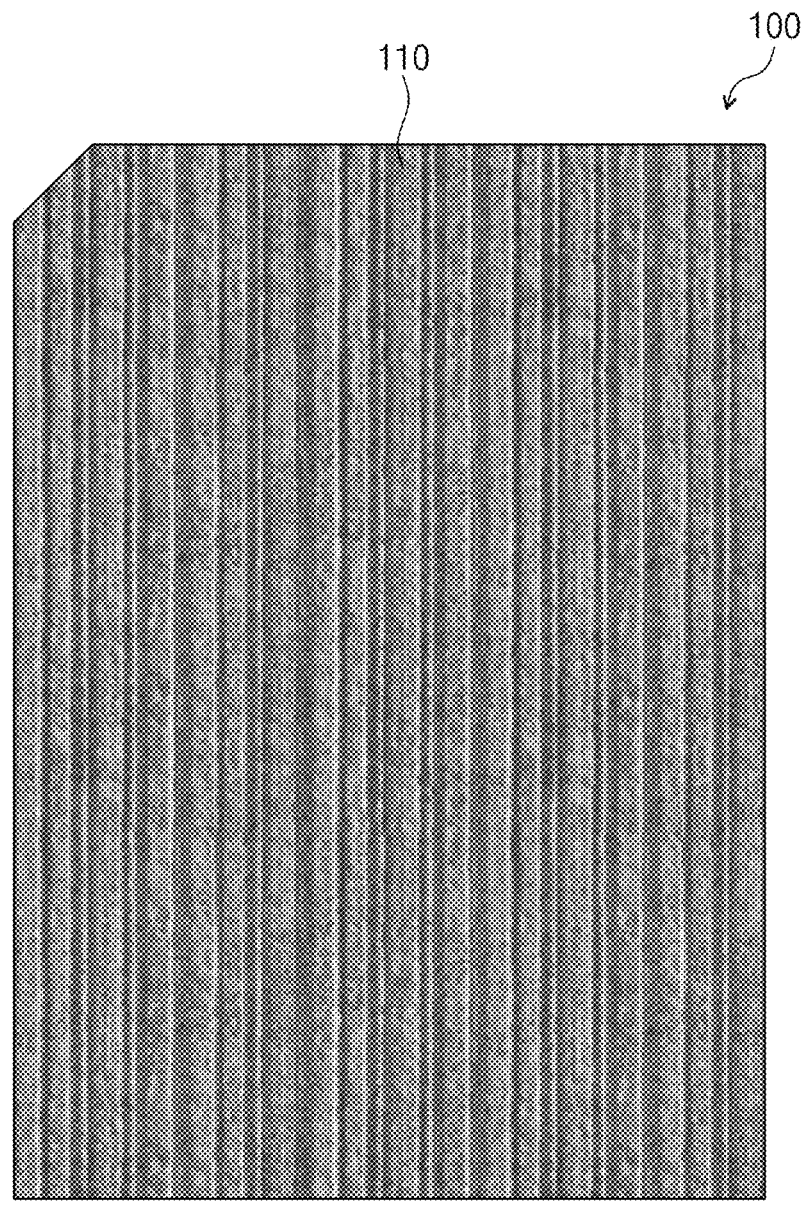
Figure 5C:
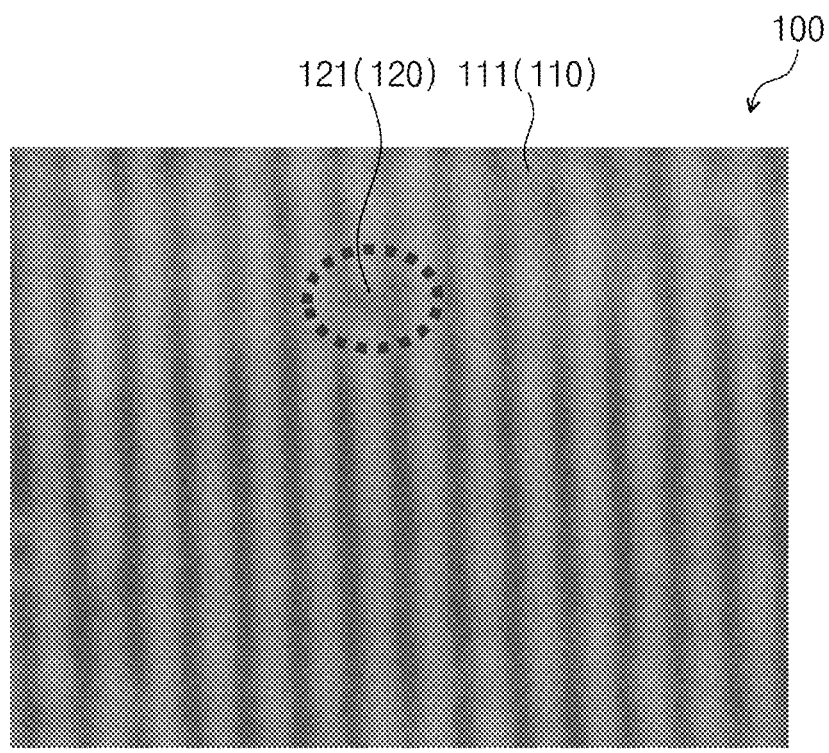

FIG. 5A illustrates a simplified plan view showing an inspection object according to an embodiment of the present invention. FIG. 5B illustrates a plan view showing an inspection object according to an embodiment of the present invention. FIG. 5C illustrates an enlarged view partially showing an inspection object according to an embodiment of the present invention.

For convenience of description, the following will describe the beam BMc which is reflected from the inspection object 100 and whose path is changed. The following description is not limited to only the beam BMc which is reflected from the inspection object 100, and may also be applicable to the beam BMc which passes through the inspection object 100.

Referring to FIGS. 5A to 5C, the inspection object 100 according to an embodiment of the present invention may include a first part 110 and a second part 120.

In an embodiment, for example, the first part 110 may include a plurality of first protrusions 111 each of which extends along one direction and which are arranged along a direction that intersects the one direction. The second part 120 may include at least one second protrusion 121 positioned between two adjacent first protrusions 111. The first protrusion 111 and the second protrusion 121 may each be provided in plural, but the present invention is not limited to a specific embodiment. The one direction may be the first direction DR1, and the direction intersecting the one direction may be the second direction DR2.

In an embodiment of the present invention, the first protrusion 111 and the second protrusion 121 may have their shapes that are different from each other. Therefore, as discussed below, when the beam (see BMi of FIG. 4A)

irradiated from the light source (see LA of FIG. 4A) to the inspection object 100 is reflected from the inspection object 100, a path of the reflected beam (see BMc of FIG. 4A) may be changed based on whether the beam BMi is irradiated to and reflected from either the first part 110 or the second part 120.

The first part 110 may form a repetitive grid structure. In response to the repetitive grid structure of the first part 110, a beam irradiated to the first part 110 may have a path conforming to a specific rule. In an embodiment, for example, the first protrusion 111 may be provided in the form of a regular grid structure.

However, the first part 110 is not limited to the regular grid structure, and may have an irregular grid structure without being limited to a certain embodiment. Even when the first part 110 has an irregular grid structure, a reflected beam may have a path that is changed in accordance with an irradiation position of the beam (see BMi of FIG. 4A). In this case, unlike the repetitive grid structure, a beam reflected from the first part 110 may not have a path conforming to a specific rule. The description above may also be applicable to incidence of a beam that passes through the first part 110.

The inspection object 100 may include a first region A1 and a second region A2. The first region A1 and the second region A2 may be different from each other, and the second region A2 may be adjacent to the first region A1.

The first region A1 may be provided in plural, and each of the plurality of first regions A1 may be defined as one cell. The one cell may be the display module (see DM of FIG. 3) or a component of the display module (see DM of FIG. 3). In an embodiment, for example, the one cell may be the display panel (see DP of FIG. 3).

Referring to FIG. 5B, in an embodiment of the present invention, the first part 110 of the inspection object 100 may have a shape that is changed in accordance with positions on the inspection object 100. Therefore, as discussed below, when the beam (see BMi of FIG. 4A) irradiated from the light source (see LA of FIG. 4A) to the inspection object 100 is reflected from the inspection object 100, a beam reflected from the first part 110 may have a path that is changed in accordance with beam irradiation positions.

Referring to FIG. 5C, unlike FIG. 5A, the second part 120 according to an embodiment of the present invention may be positioned on the first part 110. In an embodiment, for example, the second protrusion 121 may be located on the first protrusion 111. In this case, when the beam (see BMi of FIG. 4A) irradiated to the inspection object 100 is reflected from the first part 110 or the first protrusion 111, a reflected beam may have a path that is changed in accordance with beam irradiation positions.

This may be caused by a difference in shape between the first protrusions 111 or by the second protrusion 121 disposed on the first protrusion 111.

In addition, according to an embodiment of the present invention, the first part 110 and the second part 120 of the inspection object 100 may include different materials from each other. Thus, when the beam (see BMi of FIG. 4A) is irradiated to and reflected from the inspection object 100, a beam reflected from the first part 110 may have a path different from a path of a beam reflected from the second part 120.

Figure 5D:
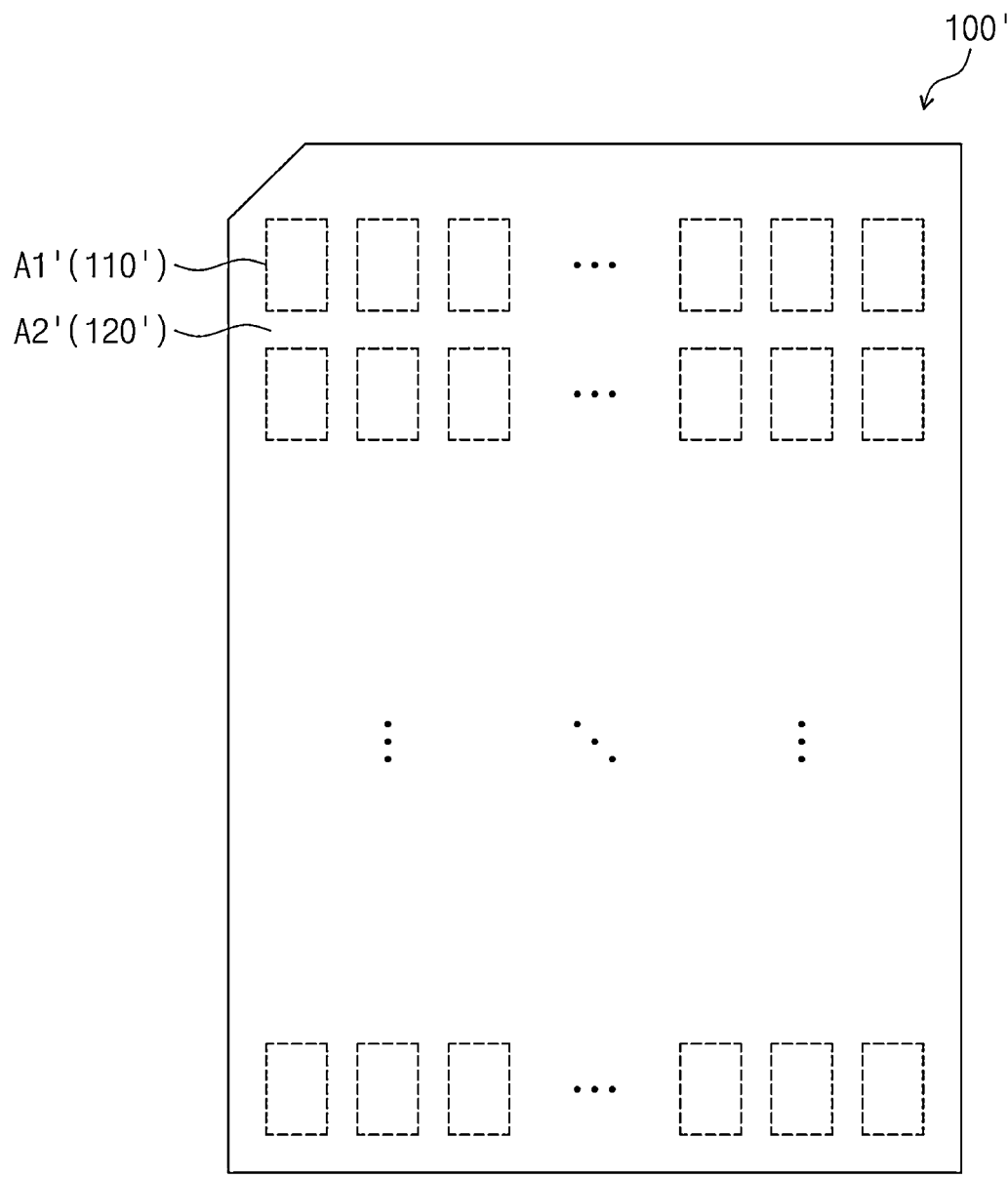

FIG. 5D illustrates a plan view showing an inspection object according to an embodiment of the present invention.

Referring to FIG. 5D, an inspection object 100' may include a first region A1' and a second region A2' adjacent to the first region A1'. Compared to the inspection object (see 100 of FIG. 5A) discussed above, the first region A1' and the second region A2' of the inspection object 100' depicted in FIG. 5D may be defined as a first part 110' and a second part 120', respectively.

In an embodiment, for example, when the first region A1' is defined as one cell, the second region A2' may be defined as a space between cells. The first region A1' and the second region A2' may include different materials from each other.

A beam path changed at the first part 110' may be different from that changed at the second part 120'.

Figure 6:
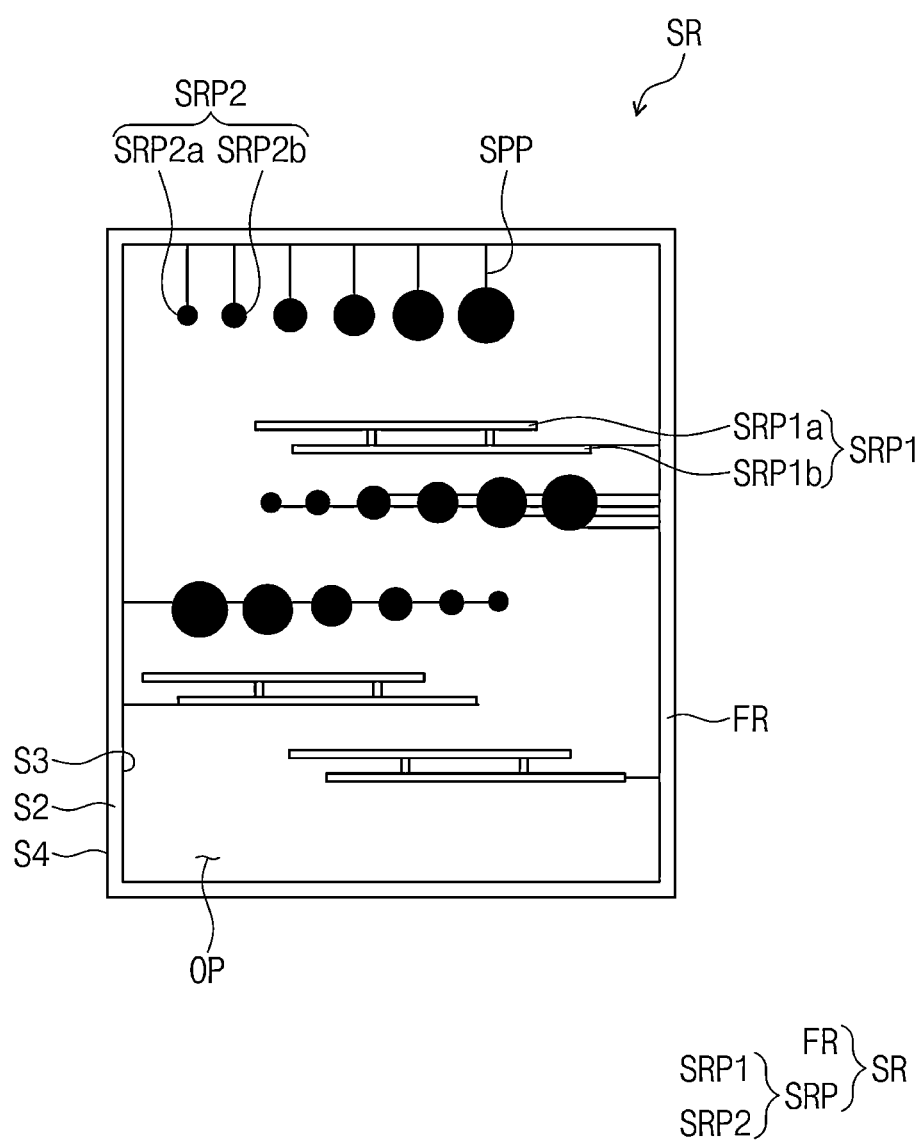
FIG. 6 illustrates a plan view showing a separator according to an embodiment of the present invention.

FIG. 6 illustrates a plan view showing a separator according to an embodiment of the present invention.

Referring to FIG. 6, the separator SR may include a frame FR and a separation member SRP. As discussed above, the frame FR may include the first surface S1, the second surface S2, the third surface S3, and the fourth surface S4 (see FIG. 4A). The separator SR may further include a support member SPP through which the separation member SRP is supported by the frame FR. One end of the support member SPP may be supported by the separation member SRP, and another end of the support member SPP may be supported by the frame FR. The support member SPP may have its length and thickness that do not affect a path of a beam that passes through the separator SR.

The separation member SRP may change a path of a beam that passes through the separator SR.

The separation member SRP may be provided in plural. The plurality of separation members SRP may be disposed spaced apart from each other. The plurality of separation members SRP may include at least one first separation member SRP1 and at least one second separation member SRP2.

Figure 8A:
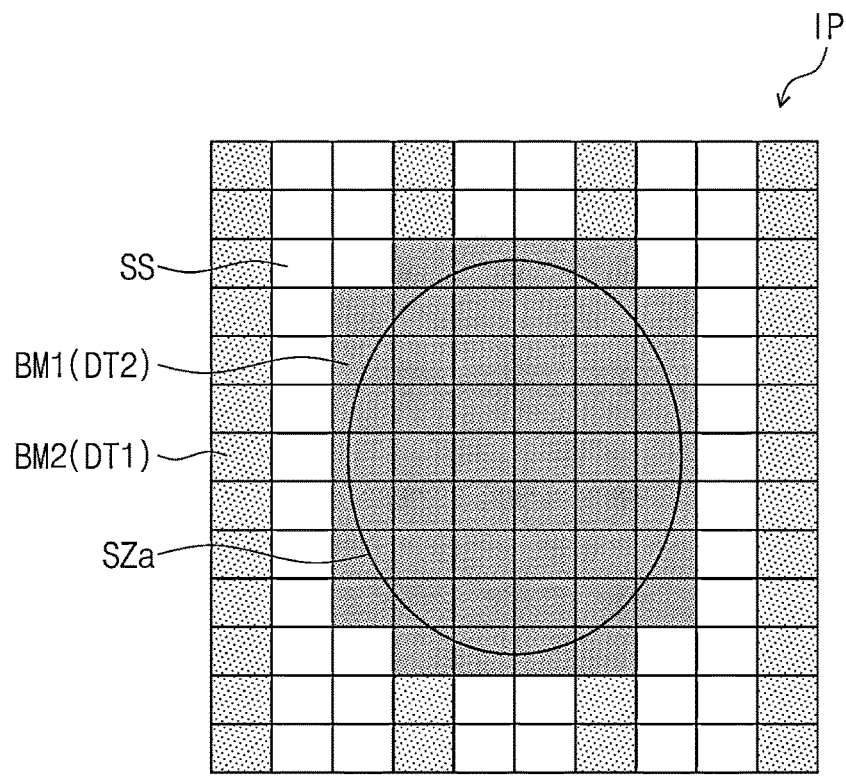
FIGS. 8A to 8C illustrate diagrams showing a step of deriving a separation critical value according to an embodiment of the present invention.

The first separation member SRP1 may output the beam (see BMc of FIG. 3A), which passes through the separator SR, as a first beam (see BM1 of FIG. 8A), and may output the beam (see BMc of FIG. 3A), which passes through the separator SR, as a second beam (see BM2 of FIG. 8A). In an embodiment, for example, the first separation member SRP1 may block or change a path of a portion of the beam (see BMc of FIG. 3A) that passes through the separator SR. The first beam (see BM1 of FIG. 8A) may indicate a beam other than that blocked by the first separation member SRP1, and may denote both a beam whose path is not changed by the first separation member SRP1 and a beam whose path is changed by the first separation member SRP1.

Likewise, the second separation member SRP2 may block or change a path of a portion of the beam (see BMc of FIG. 3A) that passes through the separator SR. The second beam (see BM2 of FIG. 8A) may indicate a beam other than that blocked by the second separation member SRP2, and may denote both a beam whose path is not changed by the second separation member SRP2 and a beam whose path is changed by the second separation member SRP2.

In this case, the beam whose path is blocked by the second separation member SRP2 and the beam whose path is changed by the second separation member SRP2 may be different from the beam whose path is blocked by the first separation member SRP1 and the beam whose path is changed by the first separation member SRP1.

The first separation member SRP1 and the second separation member SRP2 may have their shapes that are different from each other. The first separation member SRP1 may have a shape that corresponds to a shape of a portion of the first part 110, and the second separation member SRP2 may have a shape that corresponds to a shape of a portion of the second part 120.

In an embodiment, for example, when the first part 110 includes the first protrusion 111 having a grid structure as discussed above, the first separation member SRP1 may be provided in the form in which portions are separated from each other as shown in figures. When the second part 120 includes the second protrusion 121 positioned between neighboring first protrusions 111, the second separation member SRP2 may have a shape that corresponds to a shape of the second protrusion 121.

When a plurality of first separation members SRP1a and SRP1b are provided, and when a plurality of second separation members SRP2a and SRP2b are provided, the first separation members SRP1a and SRP1b may have same shapes from each other and may have different sizes from each other. Alternatively, the first separation members SRP1a and SRP1b may have different shapes from each other, but the present invention is not limited to a certain embodiment. The second separation members SRP2a and SRP2b may have different shapes from each other. Alternatively, the second separation members SPR2a and SRP2b may have same shapes from each other and may have different sizes from each other, but the present invention is not limited to a certain embodiment.

The first beam (see BMI of FIG. 8A) may include a second data (see DT2 of FIG. 8A) that corresponds to a beam that is reflected from the second part 120 and passes through the opening OP. As the first separation member SRP1 has a shape that corresponds to a shape of a portion of the first part 110, the first separation member SRP1 may block or diffract a path of the beam (see BMc of FIG. 3A) that is reflected from the first part 110 and passes through the opening OP, and thus the first beam (see BM1 of FIG. 8A) may include the second data (see DT2 of FIG. 8A).

The second beam (see BM2 of FIG. 8A) may include a first data (see DT1 of FIG. 8A) that corresponds to a beam that is reflected from the first part 110 and passes through the opening OP. As the second separation member SRP2 has a shape that corresponds to a shape of a portion of the second part 120, the second separation member SRP2 may block or diffract a path of the beam (see BMc of FIG. 3A) that is reflected from the second part 120 and passes through the opening OP, and thus the second beam (see BM2 of FIG. 8A) may include the first data (see DT1 of FIG. 8A).

However, the first beam (see BMI of FIG. 8A) does not have only the second data (see DT2 of FIG. 8A) or the second beam (see BM2 of FIG. 8A) does not have only the first data (see DT1 of FIG. 8A). In another embodiment, the first beam (see BMI of FIG. 8A) may have a portion of the first data (see DT1 of FIG. 8A) and/or the second beam (see BM2 of FIG. 8A) may have a portion of the second data (see DT2 of FIG. 8A).

Figure 7A:
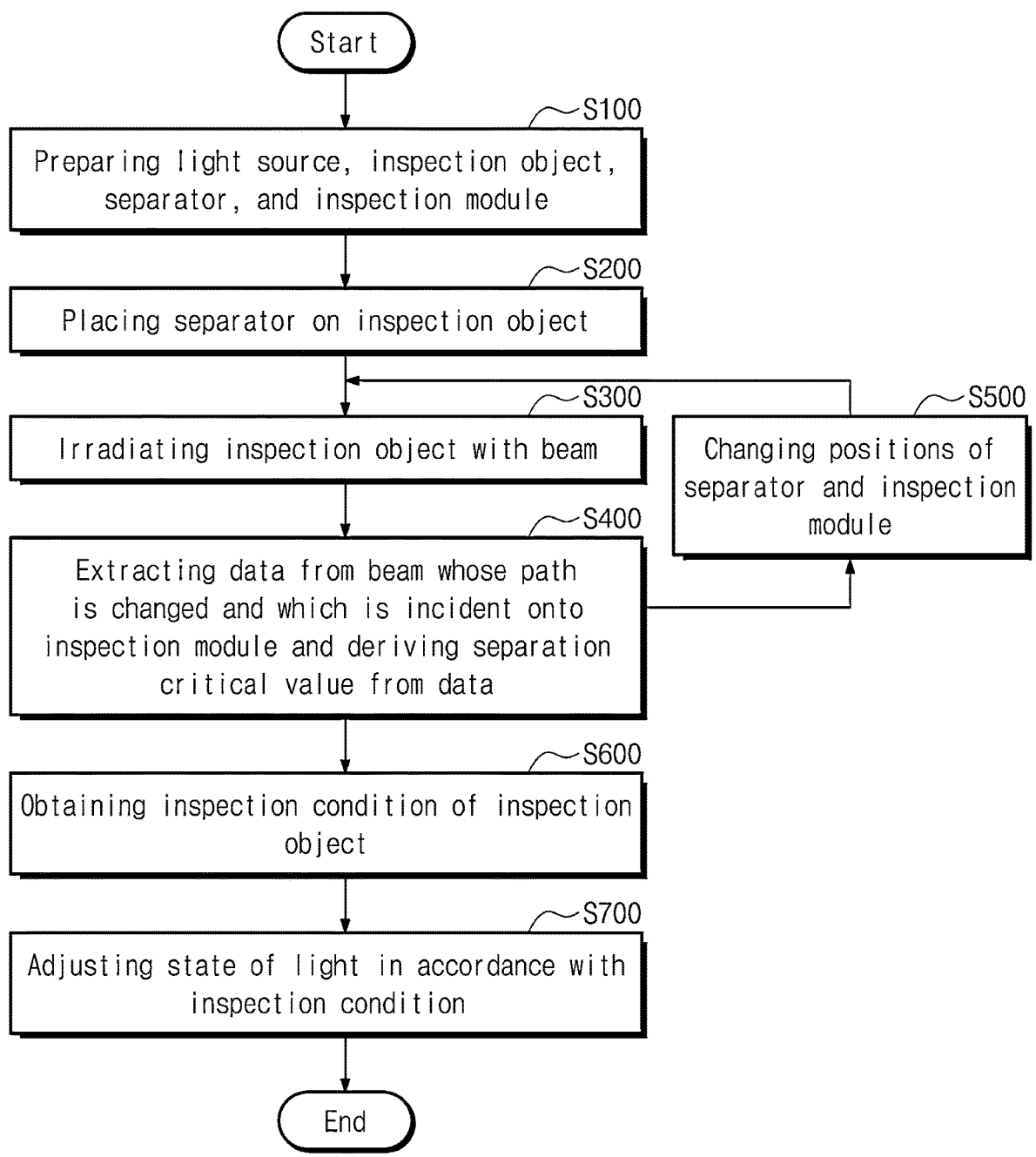
FIGS. 7A and 7B illustrate flow charts showing an inspection method according to an embodiment of the present invention.
Figure 7B:
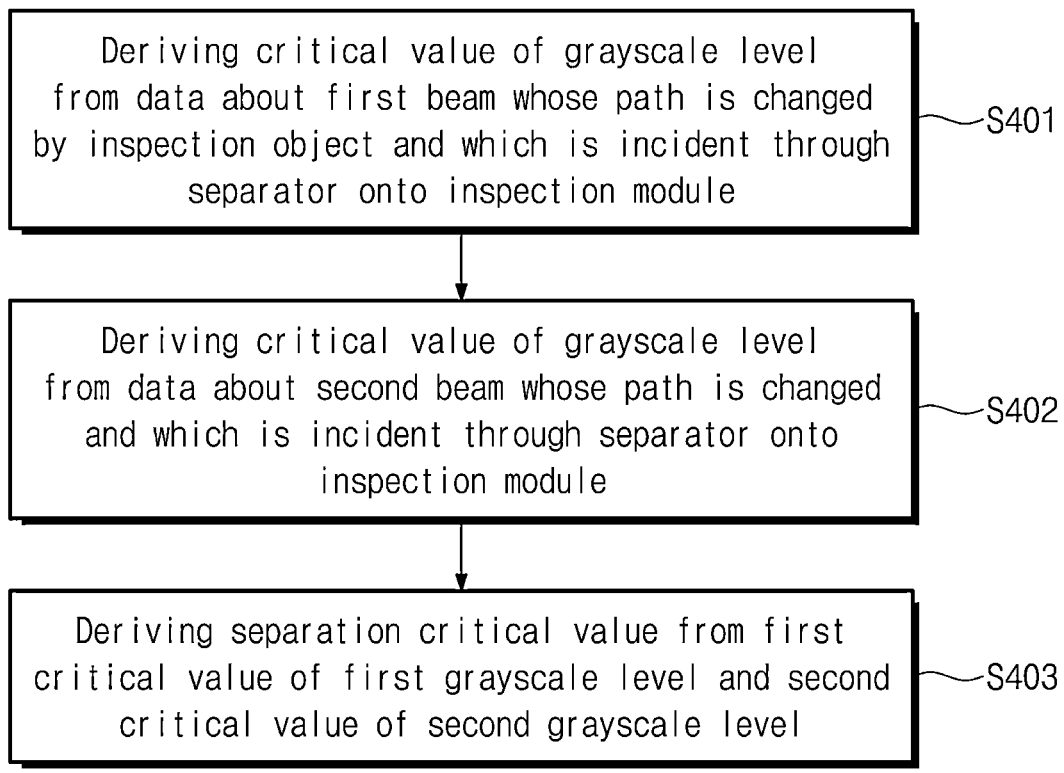

FIGS. 7A and 7B illustrate flow charts showing an inspection method according to an embodiment of the present invention. FIG. 7B illustrates a block diagram showing some steps of FIG. 7A.

The inspection apparatus ID discussed above may be used to perform the following inspection method according to an embodiment of the present invention. However, the present invention is not limited to the inspection apparatus ID discussed above, and the inspection method according to the present invention may be achieved by employing other inspection apparatuses that perform substantially the same function.

For convenience of description, an inspection object and an inspection apparatus will be described with reference to FIGS. 4A to 4C, 5A to 5D, and 6.

Referring to FIGS. 7A and 7B, an inspection method according to an embodiment of the present invention may include preparing a light source LA, an inspection object 100, a separator SR, and an inspection module IM (S100), placing the separator SR on the inspection object 100 (S200), irradiating the inspection object 100 with a beam BM (S300), extracting data from the beam BM incident from the inspection object 100 onto the inspection module IM and deriving a separation critical value from the data (S400), changing positions of the separator SR and the inspection module IM (S500), obtaining an inspection condition of the inspection object 100 (S600), and adjusting a state of light in accordance with the inspection condition (S700).

As discussed above, a beam irradiated to the inspection object 100 and changed in its path may be either the beam BMc that is reflected from the inspection object 100 or the beam BMc that passes through the inspection object 100.

The following will discuss the beam BMc which is irradiated to the inspection object 100 and whose path is changed, for example, the beam BMc that is reflected from the inspection object 100. However, the following description is not limited to the beam BMc that is reflected from the inspection object 100, and may also be applicable to the beam BMc that passes through the inspection object 100. The derivation step S400 may include: deriving a critical value of a grayscale level from data about a first beam BMI incident from the inspection object 100 through the separator SR onto the inspection module IM (S401), deriving a critical value of a grayscale level from data about a second beam BM2 reflected from the inspection object 100 and incident through the separator SR onto the inspection module IM (S402), and deriving a separation critical value from a first critical value of a first grayscale level and a second critical value of a second grayscale level (S403). In another embodiment, the beam BMc emitted from the inspection object 100 and not passing through the separator SR may be a beam whose path is changed by the inspection object 100.

According to an embodiment, the data about the first beam BM1 may include a second data (see DT2 of FIG. 8A) about a second part 120, and the data about a second beam BM2 may include a first data (see DT1 of FIG. 8A) about a first part 110.

The step S100 may be performed to prepare the light source LA, the inspection object 100, the separator SR, and the inspection module IM. In this stage, the components to be prepared may be substantially the same as the light source LA, the inspection object 100, the separator SR, and the inspection module IM that are discussed above.

Afterwards, the placement step S200 and the irradiation step S300 may be performed. In this stage, the separator SR may be disposed adjacent to or spaced apart from the inspection object 100.

According to an embodiment of the present invention, the inspection object 100 may include a first region A1 and a second region A2 adjacent to the first region A1. The first region A1 may be defined as one cell, and for example, the one cell may be a display panel. The second region A2 may be a space between cells.

On the second region A2 or the space between cells, the separator SR may be close to or spaced apart from the inspection object 100. On the second region A2 or the space between cells, a separation member SRP of the separator SR may be close to or spaced apart from the inspection object 100.

On the first region A1, the separator SR may be spaced apart from the inspection object 100. However, on the first region A1, the separator SR may not be always spaced apart from the inspection object 100, and on a non-display region of the first region A1, the separator SR may be close or adjacent to the inspection object 100. In this case, when viewed in plan, the separator SR may not overlap any of wiring lines and pads on the non-display region.

In this description, a display region may correspond to the active region AA-ED of FIG. 1, and a non-display region may correspond to the peripheral region NAA-ED of FIG. 1.

On the display region of the first region A1, the separator SR may be spaced apart from the inspection object 100. When the separator SR does not overlap any of components such as pixels disposed on the display region, the separator SR may be adjacent to the inspection object 100 on the display region.

A beam BMi irradiated to the inspection object 100 may be incident through the inspection object 100 onto the inspection module IM.

Afterwards, the derivation step S400 may be performed to derive a separation critical value from data obtained from a beam BMt incident onto the inspection module IM This will be further discussed below in FIGS. 8A to 8C.

After that, a step may be performed in accordance with the separation critical value to adjust a wavelength of the beam BMi irradiated to the inspection object 100 and an angle θ1 at which the beam BMi is irradiated to a normal direction of the inspection object 100.

Alternatively, the position change step S500, the irradiation step S300, and the derivation step S400 may be repeatedly performed several times.

The steps discussed above may be repeated several times to obtain an inspection condition of the inspection object 100 (S600). The adjustment step S700 may be performed such that a state of light is adjusted in accordance with the inspection condition of the inspection object 100.

In an embodiment, for example, the state of light may include a wavelength of the beam BMi irradiated from the light source LA to the inspection object 100 and an angle θ1 between a normal direction of the inspection object 100 and the beam BMi irradiated to the inspection object 100. The obtainment step S600 and the adjustment step S700 will be further discussed below.

Figure 8B:
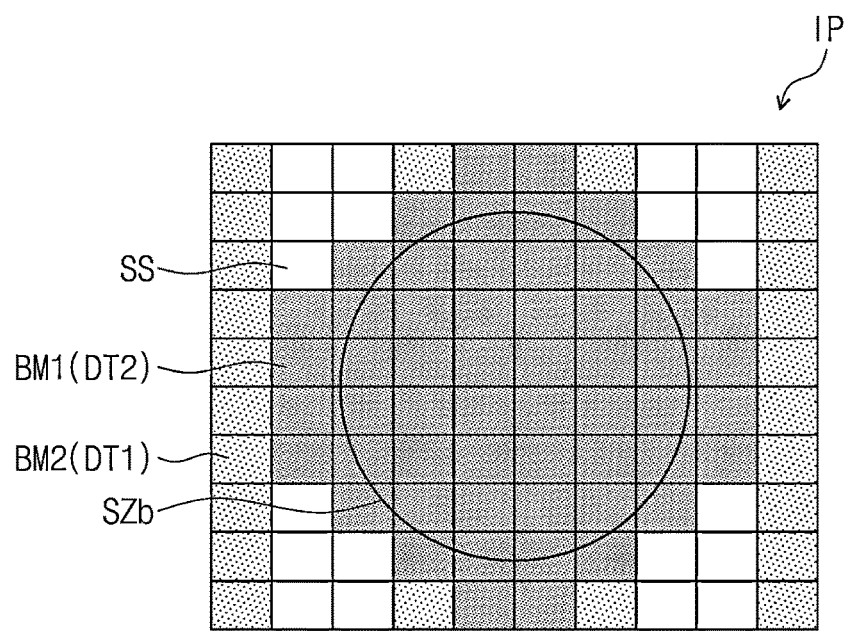
Figure 8C:
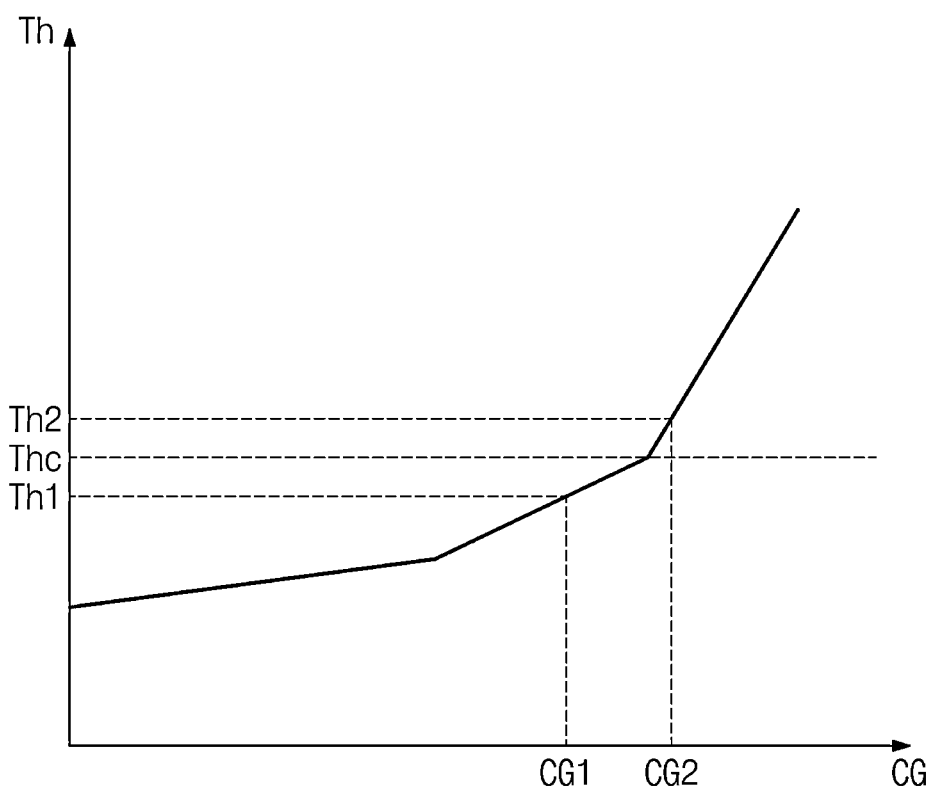

FIGS. 8A to 8C illustrate diagrams showing a step of deriving a separation critical value according to an embodiment of the present invention. In detail, FIG. 8A illustrates a diagram showing a certain case where a separation critical value is derived from data converted from the beam BMt incident onto the imaging part IP according to an embodiment of the present invention. FIG. 8B illustrates a diagram showing a certain case where a separation critical value is derived from data converted from the beam BMt incident onto the imaging part IP according to an embodiment of the present invention. FIG. 8C illustrates a graph showing a range of a separation critical value according to an embodiment of the present invention.

Referring to FIGS. 8A to 8C, the imaging part IP may include a plurality of sensors SS. The beam BM incident onto the inspection module IM may be introduced to the plurality of sensors SS, and the introduced beam BM may be converted into data. The conversion of the beam BM into data may be substantially the same as that in which the beam BM is used to cause the imaging part IP to capture a surface or an inside of the inspection object 100. For example, the conversion of the beam BM into data may mean that the beam BM is irradiated to the inspection object 100, and among the beam BMc reflected from the inspection object 100, the beam BMt incident onto the inspection module IM is used to capture a specific region of the inspection object 100.

The beam BMt incident through the separator SR onto the inspection module IM may include a first beam BM1 and a second beam BM2. The first beam BM1 and the second beam BM2 may each be introduced to a plurality of sensors SS. As shown in figures, the first beam BM1 may be incident onto a plurality of sensors SS that are arranged along one direction and another direction that intersects the one direction. The second beam BM2 may be introduced to adjacent a plurality of sensors SS.

On a plurality of sensors SS, the first beam BMI may be converted into a second data DT2, and on a plurality of sensors SS, the second beam BM2 may be converted into a first data DT1.

As discussed above, the first separation member SRP1 may output the beam BM passing through the separator SR as the first beam BM1, and the second separation member SRP2 may output the beam BM passing through the separator SR as the second beam BM2. The first beam BMI may include the second data DT2 corresponding to the beam BM that is reflected from the second part 120 and passes through the separator SR or the opening OP, and the second beam BM2 may include the first data DT1 corresponding to the beam BM that is reflected from the first part 110 and passes through the separator SR or the opening OP.

Therefore, on a plurality of sensors SS, the first beam BMI may be converted into the second data DT2, and on a plurality of sensors SS, the second beam BM2 may be converted into the first data DT1.

Referring to FIG. 8C, based on a grayscale level of a comparative data, the data processing part DPP may derive a separation critical value Thc from the first data DT1 and the second data DT2. For example, a first critical value Th1 may be established based on a first grayscale level CG1 of a first comparative data which is to be compared with the first data DT1, a second critical value Th2 may be established based on a second grayscale level CG2 of a second comparative data which is to be compared with the second data DT2, and a separation critical value Thc may be derived from the first critical value Th1 and the second critical value Th2.

For example, the first comparative data which is to be compared with the first data DT1 may be data about a portion of the inspection object 100 other than the first part 110 and the second part 120. For convenience of description, a third part may be defined to indicate the portion of the inspection object 100 other than the first part 110 and the second part 120. Likewise, the second comparative data which is to be compared with the second data DT2 may be data about the third part of the inspection object 100 other than the first part 110 and the second part 120.

Based on a first grayscale level of data about the third part, a first critical value Th1 may be derived such that data about the first part 110 and data about the third part are distinguished from each other in the first data DT1. In addition, based on a second grayscale level of data about the third part, a second critical value Th2 may be derived such that data about the second part 120 and data about the third part are distinguished from each other in the second data DT2. As the first critical value Th1 is used to distinguish data about the first part 110 and data about the third part from each other in the first data DT1, and as the second critical value Th2 is used to distinguish data about the second part 120 and data about the third part from each other in the second data DT2, the first part 110 and the second part 120 may be distinguished from each other in data by a specific critical value defined as a separation critical value Thc between the first critical value Th1 and the second critical value Th2.

In an embodiment, as regards a comparative object substantially the same as the inspection object 100, the first comparative data may be a comparative data about the second part 120 in a case where only the second part 120 is present without the first part 110. As regards a comparative object substantially the same as the inspection object 100, the second comparative data may be a comparative data about the first part 110 in a case where only the first part 110 is present without the second part 120.

In this case, based on the first grayscale level of the first comparative data about the second part 120, a first critical value Th1 may be derived to distinguish data about the first part 110 and data about the second part 120 from each other in the first data DT1. In addition, based on the second grayscale level of the second comparative data about the first part 110, a second critical value Th2 may be derived to distinguish data about the second part 120 and data about the first part 110 from each other in the second data DT2. The first critical value Th1 and the second critical value Th2 may be used to distinguish the first part 110 and the second part 120 from each other in data, and in order to clearly distinguish a difference between the first part 110 and the second part 120, a specific critical value defined as a separation critical value Thc may be used to distinguish the first part 110 and the second part 120 from each other.

The separation critical value Thc may have a range between the first critical value Th1 and the second critical value Th2. For example, the separation critical value Thc may be an intermediate value between the first critical value Th1 and the second critical value Th2. However, the separation critical value Thc is not limited to a specific value, and may be changed in accordance with beam irradiation positions on the inspection object 100.

Thereafter, in accordance with the derived separation critical value Thc, the controlling part CP may adjust a state of the beam BM irradiated from the light source LA to the inspection object 100.

Referring to FIGS. 8A and 8B, the number of the sensors SS to which the beam BM is introduced in the imaging part IP may be changed in accordance with the separation critical value Thc selected between the first critical value Th1 and the second critical value Th2. For example, there may be a change in irradiation region of the beam BM introduced to the sensors SS of the imaging part IP.

In FIG. 8A, it may be ascertained that the first beam BMI is introduced to the sensors SS within a preset zone Sza by adjusting a state of the beam BM irradiated from the light source LA to the inspection object 100 in accordance with a selected separation critical value Thc. In FIG. 8A, when only the sensors SS within the preset zone Sza are operated, data about the second part 120 may be provided without loss through the first beam BM1.

In FIG. 8B, it may be ascertained that the first beam BMI is also introduced to the sensors SS outside a preset zone Szb by adjusting a state of the beam BM irradiated from the light source LA to the inspection object 100 in accordance with a selected separation critical value different from that of FIG. 8A. In FIG. 8B, when only the sensors SS within the preset zone Szb are operated, data about the second part 120 may be provided with some loss through the first beam BM1. The preset zone Sza of FIG. 8A may be the same as the preset zone Szb of FIG. 8B.

When only the sensors SS within a preset zone are operated, a specific separation critical value Thc may be selected between first and second critical values Th1 and Th2, and then in accordance with the specific critical value, a state of the beam BM irradiated to the inspection object 100 may be adjusted and thus data about the second part 120 may be provided without loss through the first beam BM1.

Figure 9A:
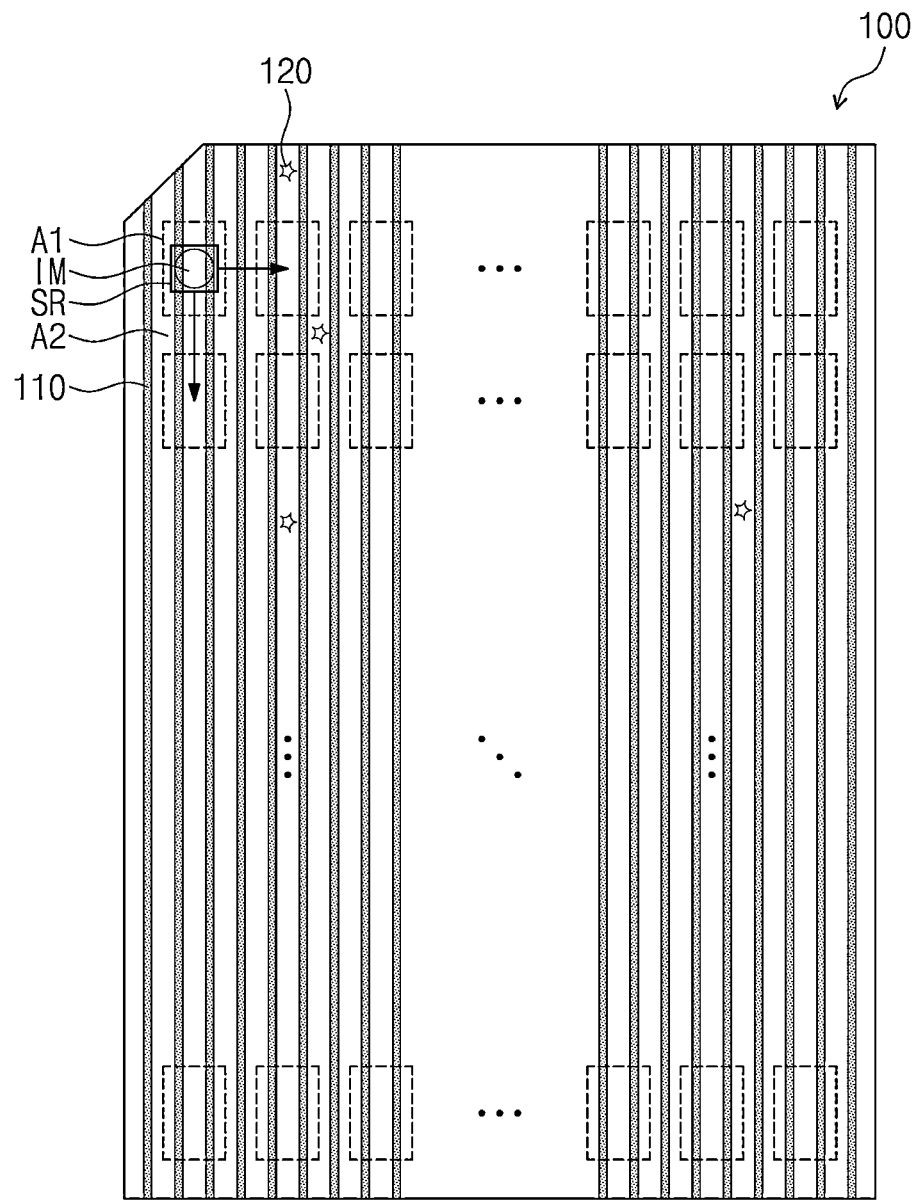
FIGS. 9A and 9B illustrate plan views showing a step of obtaining an inspection condition according to an embodiment of the present invention.
Figure 9B:
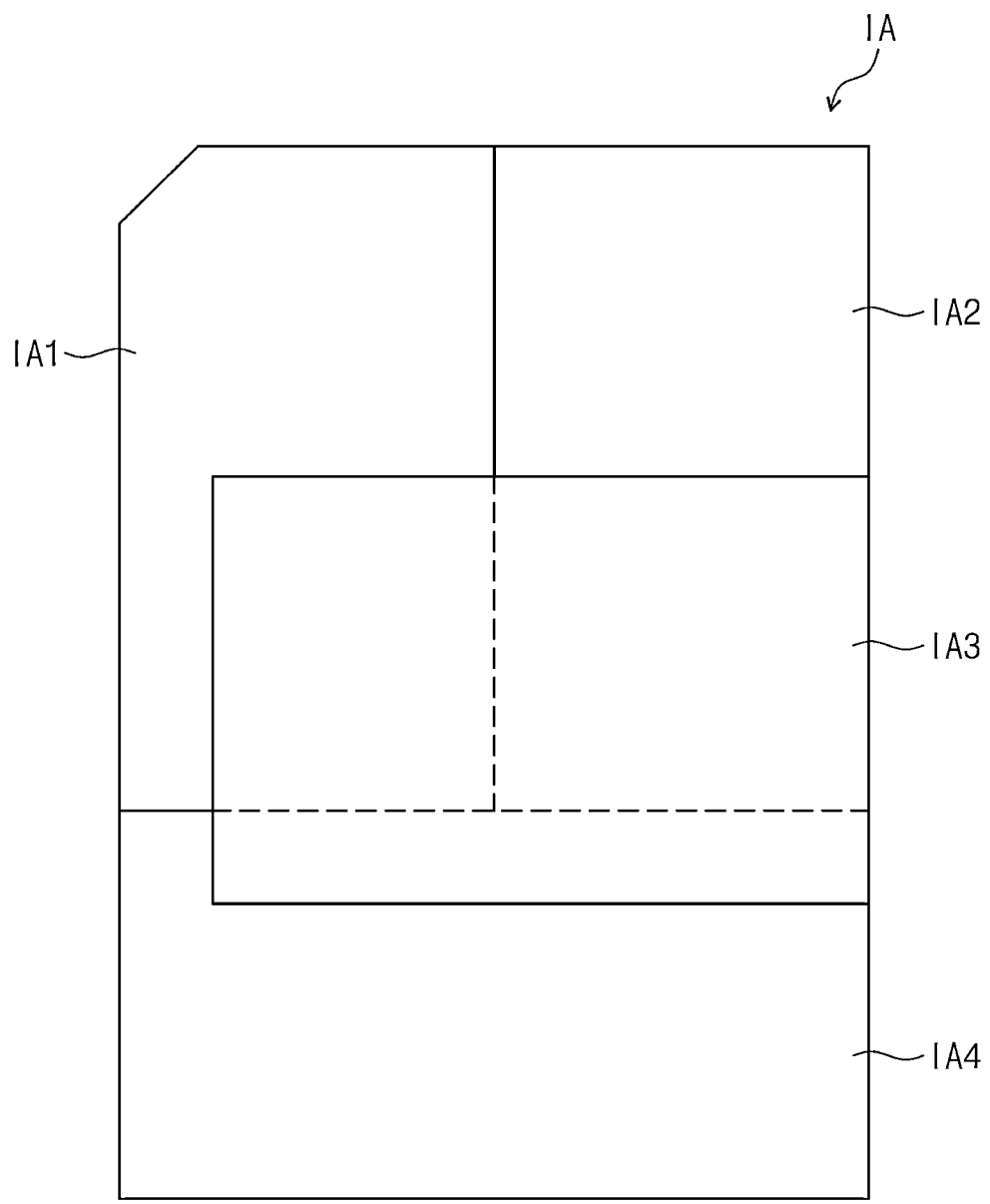

FIGS. 9A and 9B illustrate plan views showing a step of obtaining an inspection condition according to an embodiment of the present invention. For example, FIG. 9A illustrates a diagram showing movements of the inspection module IM and the separator SR of the inspection apparatus ID according to an embodiment of the present invention. FIG. 9B illustrates a simplified diagram showing an inspection condition according to an embodiment of the present invention.

Referring to FIG. 9A, the obtainment step S600 may include repeatedly deriving a separation critical value Thc for each of all positions on the inspection object 100.

According to an embodiment of the present invention, the position change step S500, the irradiation step S300, and the derivation step S400 may be repeatedly performed several times.

For example, the several times may be equal to or greater than a minimum number of times for deriving a separation critical value Thc for all positions on the inspection object 100. The separation critical value Thc for all positions on the inspection object 100 may be derived not only by changing positions of the separator SR and the inspection module IM, but also by changing a position of one of the inspection object 100 and the light source LA.

Referring to FIG. 9B, in accordance with a separation critical value Thc of an inspection condition, an entire division IA of the inspection object 100 may be divided into four divisions, or a first division IA1, a second division IA2, a third division IA3, and a fourth division IA4.

In this case, a separation critical value Thc may be identical in each division. For example, when the separator SR and the inspection module IM are positioned on the first division IA1, a separation critical value Thc may be identical at any position in the first division IA1.

All divisions may have the same separation critical value Thc. Alternatively, some of divisions may have the same separation critical value Thc, but the present invention is not limited to a certain one embodiment.

The present invention, however, is not limited to four divisions as shown in figures, and in accordance with a separation critical value Thc of an inspection condition, the inspection object 100 may be divided to have less than or greater than 4 divisions in another embodiment.

Afterwards, a step may be performed in which the separator SR and the inspection module IM move to a first position, and a step may be performed in which a separation critical value Thc with respect to the first position is calculated based on an inspection condition and then a state of the beam BM irradiated to the inspection object 100 is adjusted based on the calculated separation critical value Thc.

In this case, as discussed above, the state of the beam BM may include a wavelength of the beam BM irradiated from the light source LA to the inspection object 100 and an angle $\theta 1$ between a normal direction of the inspection object 100 and the beam BM irradiated to the inspection object 100.

The first position may be an arbitrary location on the inspection object 100, without being limited to a specific location.

A separation critical value Thc with respect to the arbitrary location may be calculated based on the inspection condition, and on the basis of the calculated separation critical value Thc, a state of the beam BM irradiated to the inspection object 100 may be adjusted to extract data only about the first part 110 of the inspection object 100 or data only about the second part 120 of the inspection object 100. For example, noiseless data may be obtained by extracting data only about a specific part which is to be inspected in the inspection object 100 without extracting data about a part which is not to be inspected in the inspection object 100.

For example, the light source LA, the separator SR, and the inspection module IM may be used to derive an inspection condition about the inspection object 100 on which a repetitive structure is formed. After that, a separation critical value Thc for a position of the inspection module IM may be calculated based on an inspection condition, and the calculated separation critical value Thc may be used to adjust a state of light. In accordance with the separation critical value Thc at which data about the repetitive structure on the inspection object 100 is not extracted, the beam BM may be irradiated to the inspection object 100 and a reflected beam BM may be incident onto the inspection module IM, such that it may be possible to obtain only noiseless data about foreign substances or defects which are intended to detect on the inspection object 100.

The inspection apparatus ID and the inspection method according to an embodiment of the present invention may be used to derive an inspection condition capable of effectively eliminating noise, and on the basis of the inspection condition, the inspection object 100 may be inspected to increase inspection efficiency and to decrease inspection costs. In addition, it may be possible to prevent unexpected accidents and to avoid time and cost problems that can occur due to re-operation of the inspection apparatus ID shut down with noise or re-execution of the inspection method shut down with noise.

An inspection apparatus and method according to an embodiment of the present invention may use a separator to effectively detect foreign substances on an inspection object.

An inspection apparatus and method according to an embodiment of the present invention may use a separator to effectively eliminate noise other than foreign substances so as to efficiently detect the foreign substances or defects on an inspection object.

An inspection apparatus and method according to an embodiment of the present invention may use a separator to derive an inspection condition capable of effectively eliminating noise when foreign substances or defects are detected in accordance with irradiation positions of a beam irradiated to an inspection object.

An inspection apparatus and method according to an embodiment of the present invention may increase inspection efficiency and decrease inspection costs by inspecting an inspection object under an inspection condition capable of effectively eliminating noise.

An inspection apparatus and method according to an embodiment of the present invention may inspect an inspection object under an inspection condition capable of effectively eliminating noise to thereby avoid time and cost problems that can occur due to re-operation of the inspection apparatus shut down with noise or re-execution of the inspection method shut down with noise.

Although the embodiments have been described with reference to a number of illustrative examples thereof, it will be understood by those of ordinary skill in the art that various changes in form and details may be made without departing from the spirit and scope of the present invention as set forth in the following claims. Thus, the technical scope of the present invention is not limited by the embodiments and examples described above, but by the following claims.

What is claimed is:

1. An inspection apparatus, comprising:
a light source configured to irradiate a beam to an inspection object including a first part and a second part different from the first part;
an inspection module spaced apart from the inspection object and onto which a beam, whose path is changed after being irradiated to the inspection object, is incident; and
a separator between the inspection object and the inspection module and through which at least a portion of the beam, whose path is changed, passes,
wherein the separator includes:
a frame in which an opening is defined; and
a separation member in the opening and configure to change a path of a beam, which passes through the separator, wherein the separation member is provided in plural and the plurality of separation members are spaced apart from each other, wherein the separation members include: at least one first separation member configured to convert a beam, which passes therethrough, into a first beam; and at least one second separation member configured to convert a beam, which passes therethrough, into a second beam.

2. The inspection apparatus of claim 1,
wherein the first beam has a second data corresponding to a beam, which is reflected from the second part and passes through the opening, and
wherein the second beam has a first data corresponding to a beam, which is reflected from the first part and passes through the opening.

3. The inspection apparatus of claim 2, wherein the inspection module includes:
an imaging part, onto which the beam passing through the separator is incident, and configured to convert the incident beam into the first data and the second data;
a data processing part configured to establish a first critical value based on a first grayscale level of a first comparative data which is to be compared with the first data, establish a second critical value based on a second grayscale level of a second comparative data which is to be compared with the second data, and derive a separation critical value from the first critical value and the second critical value; and
a controlling part configured to adjust a state of the beam irradiated from the light source to the inspection object in accordance with the separation critical value.

4. The inspection apparatus of claim 3, wherein, in accordance with the separation critical value, the controlling part adjusts at least one of a wavelength of the beam irradiated to the inspection object and an angle at which the beam is irradiated to the inspection object with respect to a normal direction of the inspection object.

5. The inspection apparatus of claim 3, further comprising a moving module configured to change positions of the separator and the imaging part,
wherein the moving module drives the separator to rotate or drives the separator and the imaging part to move on the inspection object.

6. The inspection apparatus of claim 1, wherein the first part and the second part include different materials from each other.

7. The inspection apparatus of claim 1, wherein
the first part includes a plurality of first protrusions each of which extends along one direction and which are arranged along a direction that intersects the one direction, and
the second part includes at least one second protrusion between adjacent first protrusions of the plurality of first protrusions.

8. An inspection method, comprising:
preparing a light source, an inspection object that includes a first part and a second part different from the first part, a separator that includes a frame in which an opening is defined and a separation member in the opening, and an inspection module;
placing the separator on the inspection object, placing the inspection module spaced apart from the inspection object across the separator, and irradiating, by the light source, a beam to the inspection object;
obtaining data converted from a beam incident from the inspection object through the separator onto the inspection module; and
based on a grayscale level of a comparative data, deriving a separation critical value from data about a first beam and data about a second beam in the beam incident onto the inspection module, wherein the first beam and the second beam have different critical values from each other.

9. The inspection method of claim 8, wherein the separation member is provided in plural and the plurality of separation members are spaced apart from each other,
wherein the separation members include:
at least one first separation member configured to convert a beam, which passes therethrough, into the first beam; and
at least one second separation member configured to convert a beam, which passes therethrough, into the second beam,
wherein the first beam has a second data corresponding to a beam, which is reflected from the second part and passes through the opening, and
wherein the second beam has a first data corresponding to a beam, which is reflected from the first part and passes through the opening.

10. The inspection method of claim 9, wherein deriving the separation critical value includes:
establishing a first critical value based on a grayscale level of a first comparative data which is to be compared with the first data;
establishing a second critical value based on a grayscale level of a second comparative data which is to be compared with the second data; and
deriving the separation critical value from the first critical value and the second critical value.

11. The inspection method of claim 8, further comprising, in accordance with the separation critical value, adjusting at least one of a wavelength of the beam irradiated to the inspection object and an angle at which the beam is irradiated to the inspection object with respect to a normal direction of the inspection object.

12. The inspection method of claim 8, further comprising:
changing positions of the separator and the inspection module, and thereafter irradiating the inspection object with the beam to derive the separation critical value, irradiating the beam being performed repeatedly several times; and
obtaining an inspection condition as a set of separation critical values for the positions of the inspection module.

13. The inspection method of claim 12, further comprising:
moving the inspection module to a first position; and
based on the inspection condition, calculating a separation critical value with respect to the first position; and
based on the calculated separation critical value, adjusting at least one of a wavelength of the beam irradiated to the inspection object and an angle at which the beam is irradiated to the inspection object with respect to a normal direction of the inspection object.

14. The inspection method of claim 12, wherein the inspection object includes a first region and a second region adjacent to the first region,
wherein, in changing the positions of the separator and the inspection module,
on the first region, the separator is spaced apart from the inspection object, and
on the second region, the separator is close to or spaced apart from the inspection object.

15. The inspection method of claim 8, wherein the first part and the second part include different materials from each other.

16. The inspection method of claim 8, wherein
the first part includes a plurality of first protrusions each of which extends along one direction and which are arranged along a direction that intersects the one direction, and
the second part includes at least one second protrusion between adjacent first protrusions of the plurality of first protrusions.

17. The inspection method of claim 8, wherein the inspection module uses a bright field or a dark field.

18. An inspection apparatus, comprising:
a light source configured to irradiate a beam to an inspection object including a first part and a second part different from the first part;
an inspection module spaced apart from the inspection object and onto which a beam, whose path is changed after being irradiated to the inspection object, is incident; and
a separator between the inspection object and the inspection module and through which at least a portion of the beam, whose path is changed, passes,
wherein the separator includes:
at least one first separation member configured to convert a beam, which passes therethrough, into a first beam;
at least one second separation member configured to convert a beam, which passes therethrough, into a second beam; and
a frame, which supports the first separation member and the second separation member.

19. The inspection apparatus of claim 18, wherein
the first beam has a second data corresponding to a beam, which is reflected from the second part and passes through the separator, and
the second beam has a first data corresponding to a beam, which is reflected from the first part and passes through the separator.

20. The inspection apparatus of claim 19, wherein the inspection module includes:
an imaging part, onto which the beam passing through the separator is incident, and configured to convert the incident beam into the first data and the second data;

a data processing part configured to establish a first critical value based on a first grayscale level of a first comparative data which is to be compared with the first data, establish a second critical value based on a second grayscale level of a second comparative data which is to be compared with the second data, and derive a separation critical value from the first critical value and the second critical value; and a controlling part configured to adjust a state of the beam irradiated from the light source to the inspection object in accordance with the separation critical value.

\* \* \* \* \*